(12) United States Patent
Shi et al.

(10) Patent No.: US 10,723,859 B2
(45) Date of Patent: Jul. 28, 2020

(54) LIGNIN VALORIZATION IN IONIC LIQUIDS AND DEEP EUTECTIC SOLVENT VIA CATALYSIS AND BIOCATALYSIS

(71) Applicant: University of Kentucky Research Foundation, Lexington, KY (US)

(72) Inventors: Jian Shi, Lexington, KY (US);
Lalitendu Das, Lexington, KY (US);
Enshi Liu, Lexington, KY (US);
Joseph C. Stevens, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 101 days.

(21) Appl. No.: 16/037,516

(22) Filed: Jul. 17, 2018

(65) Prior Publication Data

US 2019/0203012 A1    Jul. 4, 2019

Related U.S. Application Data

(60) Provisional application No. 62/533,449, filed on Jul. 17, 2017.

(51) Int. Cl.
| | |
|---|---|
| *C08H 6/00* | (2010.01) |
| *C08J 11/16* | (2006.01) |
| *C08J 11/10* | (2006.01) |
| *C08H 7/00* | (2011.01) |
| *C08L 97/00* | (2006.01) |

(52) U.S. Cl.
CPC .............. *C08J 11/105* (2013.01); *C08H 6/00* (2013.01); *C08J 11/16* (2013.01); *C08L 97/005* (2013.01); *C08J 2397/00* (2013.01); *C12Y 110/03002* (2013.01)

(58) Field of Classification Search
None
See application file for complete search history.

(56) References Cited

U.S. PATENT DOCUMENTS

| | | | |
|---|---|---|---|
| 6,177,575 B1 * | 1/2001 | Arduengo, III ...... | C07D 231/12 548/335.1 |
| 8,030,030 B2 * | 10/2011 | Varanasi .................. | C12P 7/10 435/72 |
| 8,721,795 B2 * | 5/2014 | Fanselow ................. | C07H 3/02 127/37 |

(Continued)

FOREIGN PATENT DOCUMENTS

| | | |
|---|---|---|
| CN | 106517190 A | 3/2017 |
| WO | WO2010094697 A1 | 8/2010 |

OTHER PUBLICATIONS

Aqueous ionic liquids and deep eutectic solvents for cellulosic biomass pretreatment and saccharification (Year: 2014).*

(Continued)

*Primary Examiner* — Peter A Salamon
(74) *Attorney, Agent, or Firm* — King & Schickli, PLLC

(57) ABSTRACT

This invention relates to a method for extracting valorized compounds from lignin by contacting lignins with an ionic liquid and/or a deep eutectic solvent and adding a catalyst and/or a biocatalyst to assist in breaking down the source material. Converting lignin into high value chemicals adds revenues for a bio-refinery and helps to improve the economic viability of biofuel production.

19 Claims, 22 Drawing Sheets

(56) References Cited

U.S. PATENT DOCUMENTS

| | | | |
|---|---|---|---|
| 8,722,878 B2* | 5/2014 | Raines | C08B 1/003 536/124 |
| 8,728,320 B2* | 5/2014 | Borden | B01J 20/24 127/1 |
| 8,790,542 B2* | 7/2014 | Dibble | C12P 19/02 252/182.12 |
| 8,993,274 B2 | 3/2015 | Romero | |
| 9,045,383 B2* | 6/2015 | Qiao | C13K 1/02 |
| 9,056,893 B2* | 6/2015 | Paripati | C07G 1/00 |
| 9,157,030 B2 | 10/2015 | Qiao et al. | |
| 9,157,130 B2* | 10/2015 | Brennan | C13K 1/02 |
| 9,162,951 B2 | 10/2015 | Ryba et al. | |
| 9,194,012 B2 | 11/2015 | Hamrick | |
| 9,212,104 B2 | 12/2015 | Qiao et al. | |
| 9,267,181 B2* | 2/2016 | Dhepe | C13K 13/002 |
| 9,309,548 B2* | 4/2016 | Bleyer | C12P 19/14 |
| 9,340,476 B2 | 5/2016 | Elliott et al. | |
| 9,382,282 B2 | 7/2016 | Bozell et al. | |
| 9,388,251 B2 | 7/2016 | Olkowski et al. | |
| 9,422,215 B2 | 8/2016 | Samec et al. | |
| 9,447,539 B2* | 9/2016 | Zhang | C08H 8/00 |
| 9,512,495 B2* | 12/2016 | Eyal | C08H 8/00 |
| 9,550,710 B2* | 1/2017 | Dhepe | C07C 27/00 |
| 2009/0020112 A1* | 1/2009 | Massonne | C08B 15/02 127/37 |
| 2010/0196967 A1* | 8/2010 | Edye | C12P 7/10 435/105 |
| 2011/0008863 A1 | 1/2011 | Zhu et al. | |
| 2012/0190905 A1* | 7/2012 | Gorke | B01D 53/228 585/818 |
| 2013/0052708 A1 | 2/2013 | Cheung et al. | |
| 2013/0232853 A1* | 9/2013 | Peterson | C07G 1/00 44/307 |
| 2013/0252285 A1* | 9/2013 | Blanch | C08B 1/003 435/99 |
| 2014/0093920 A1* | 4/2014 | Zhang | C12P 7/10 435/105 |
| 2014/0096923 A1 | 4/2014 | Retsina et al. | |
| 2014/0186898 A1* | 7/2014 | Retsina | C12P 19/02 435/99 |
| 2015/0184260 A1* | 7/2015 | Retsina | C12P 19/02 435/99 |
| 2015/0296872 A1* | 10/2015 | Coates | A24B 15/18 131/297 |
| 2015/0307418 A1* | 10/2015 | Frey | C07C 1/20 585/321 |
| 2015/0329887 A1* | 11/2015 | Wang | C12P 19/14 435/99 |
| 2015/0337214 A1 | 11/2015 | Murray et al. | |
| 2015/0352540 A1* | 12/2015 | Hodge | C07F 13/005 435/99 |
| 2016/0002358 A1* | 1/2016 | Teixeira | B09B 5/00 435/165 |
| 2016/0031843 A1* | 2/2016 | Socha | C07C 209/28 514/471 |
| 2016/0076112 A1* | 3/2016 | Cai | C13K 1/02 435/105 |
| 2016/0107967 A1 | 4/2016 | Van Es et al. | |
| 2016/0122379 A1* | 5/2016 | Singh | D21C 3/20 530/507 |
| 2016/0130202 A1* | 5/2016 | Barta | C07C 51/09 530/507 |
| 2016/0145178 A1* | 5/2016 | Kalnes | B01J 8/24 435/159 |
| 2016/0168726 A1* | 6/2016 | Dryfe | C01B 32/225 205/615 |
| 2016/0376300 A1 | 12/2016 | Grelier et al. | |
| 2017/0137579 A1 | 5/2017 | Rudolf von Rohr et al. | |
| 2017/0145043 A1* | 5/2017 | Subramaniam | C08H 6/00 |
| 2017/0298152 A1* | 10/2017 | Varhimo | C08B 37/0057 |
| 2017/0369918 A1* | 12/2017 | Sun | C08B 1/003 |
| 2019/0203012 A1* | 7/2019 | Shi | C08H 6/00 |

OTHER PUBLICATIONS

Electronic Supplementary Material to U listed above (Year: 2014).*
CN106517190 English machine translation.

* cited by examiner

LIGNIN VALORIZATION IN IONIC LIQUIDS AND DEEP EUTECTIC SOLVENT VIA CATALYSIS AND BIOCATALYSIS

RELATED APPLICATIONS

This application claims priority to U.S. Provisional Patent Application 62/533,449, filed Jul. 17, 2017, the contents of which are hereby incorporated by reference in their entirety.

FIELD OF THE INVENTION

The invention herein relates to a method for valorization of lignins by utilizing ionic liquids and deep eutectic solvent with catalysts and/or biocatalysts.

BACKGROUND

Lignin is a phenolic heteropolymer and is the second most abundant natural terrestrial biopolymer. Unlike cellulose, which is a polysaccharide consisting of several linear chains of 1-(1-4)-linked glucose units, lignin is an amorphous and randomly branched polymer comprised of phenylpropanoid units. Lignin constitutes up to 35% of a typical woody material by mass and 50% by energy, providing strength and rigidity to the plant cell wall. Lignocellulosic biomass has the potential to produce low molecular weight compounds, with lignin being the most promising element due to its unique aromatic backbone, which is transformable to an array of value-added chemicals. For more than a century, pulp and paper industries have been pursuing research for efficient means to upgrade lignin into value-added products. A recent thrust on using lignocellulosic biomass as a feedstock for fuels and chemicals has infused new incentives for lignin valorization. However, challenges exist during lignin fractionation possesses in retaining its native structural properties. Depending on the conversion process, more structural complexity is added to the physical and chemical properties of extracted lignin. These complications have created many obstacles in the large scale application of lignin; hence a more effective and economical lignin fractionation process that creates fewer structural complexities will provide a new dimension to the lignin recovery and its consequent valorization.

The heterogeneity of lignin (both in its varied bond chemistry and its variability between plants), however, is the primary hurdle to its targeted upgrading and reuse as a feedstock for chemicals and advanced materials. Lignin is a complex hetero-biopolymer composed of three different monomers (monolignols; H, G and S) connected through as many as eight different bonding motifs. The most common bonding motif in soft (~50%) and hardwood (~65%) lignin is the β-O-4 linkage (Henriksson 2007, Studer, DeMartini et al. 2011). In addition to being the most abundant linkage, the β-O-4 bond is also the target of nearly all lignin pretreatment scenarios (protocols) for biomass conversion (Wilkerson, Mansfield et al. 2014). During lignin extraction and thermochemical/biochemical deconstruction processes, lignin polymers are prone to multiple chemical modifications, resulting in a heterogeneous mixture from which it is difficult to analyze and separate individual lignols (Laskar, Yang et al. 2013, Ragauskas, Beckham et al. 2014, Mottiar, Vanholme et al. 2016). Thus, the key to lignin valorization is selective depolymerization of lignin in a solvent system that is compatible with a catalyst or biocatalyst.

Lignin deploymerization can be categorized into thermochemical such as high temperature pyrolysis, hydrogenolysis, catalytic oxidation and biological using lignolytic enzymes or microbes (Laskar, Yang et al. 2013, Mu, Ben et al. 2013, De Wild, Huijgen et al. 2014, Beckham, Johnson et al. 2016). Tremendous efforts have been focused on improving the catalyst efficiency and selectivity in a thermochemical conversion process (Zakzeski, Bruijnincx et al. 2010, Chatel and Rogers 2013). However, the effectiveness and selectivity of the catalyst as developed on lignin model compounds often get compromised when applied to plant derived lignin with intrinsic structural and compositional complexity (Rinaldi, Jastrzebski et al. 2016). Biological lignin deconstruction can be performed at lower temperature and pressure than thermochemical methods while product selectivity can be potentially improved via the specificity of biocatalysts (Linger, Vardon et al. 2014, Beckham, Johnson et al. 2016).

Recent advances in the application of ionic liquids (IL) and deep eutectic solvents (DES) for biomass deconstruction and subsequent lignin extraction has given new tangent to the biomass pretreatment process. ILs are a category of molten salts at room temperature, with several desirable features, such as low-toxicity, no vapor pressure, strong polarity, high stability as compared to other organic solvents. DES is a mixture of two or more hydrogen-bond donors (HBD) and hydrogen-bond acceptors (HBA). Many DESs share similar solvent characteristics of ionic liquids (ILs). In addition, DES can be easily prepared with high purity and low cost compared with ILs. Certain DESs are capable of retaining most of the advantages from ILs while at the same time overcoming some of their limitations, which makes DES a promising candidate for multiple applications including biomass deconstruction. For instance, a cholinium chloride:lactic acid-based DES acts as a mild dual acid-base catalyst that dictates the controlled cleavage of aryl ether linkages in the phenylpropane units, leading to the delignification of biomass. In a more recent study, renewable DESs were synthesized from lignin-derived phenolic compounds for delignification of switchgrass. Although lignocellulosic biomass pretreatment using IL or DES is still in nascent stage, results from several studies indicate that IL or DES may facilitate lignin dissolution from cellulosic biomass thus improving the enzymatic hydrolysis of the resulting biomass.

Catalytic lignin valorization has been widely investigated; among them catalytic hydrogenolysis has received increasing attention. During hydrogenolysis, reductive bond cleavage takes place within lignin and/or lignin model compounds in presence of hydrogen as a reducing agent. Heterogeneous catalysts have been extensively investigated to aid the bond cleavage. However, aryl ether cleavage of lignin by hydrogenolysis with H2 requires high temperature and excessive pressure due to the low solubility of H2 in many organic solvents, posing safety concerns and operational hazards towards application of this technology. As an alternative route, catalytic transfer hydrogenolysis (CTH) has shown great promise. In CTH reaction scheme, an equivalent of H2 is transferred from a donor molecule to the acceptor molecule. Hydrogen donor molecules are often inexpensive organic alcohols capable of readily generating hydrogen molecules and the same time serving as solvents for lignin. A variety of hydrogen donating agents have been tested including formic acid, methanol, ethanol, tetralin etc., among, which isopropyl alcohol (IPA) remains a popular choice due to its relatively low cost and easy subsequent separation from the reaction mixture.

Lignin depolymerization via CTH in acids, bases and supercritical alcohols have been investigated previously.

Depolymerization of lignin into monomeric phenols using formic acid, methanol, or ethanol in the presence of transition metal catalysts have been reported in several studies. An aromatic monomer yield of 6.1 wt % was obtained from CTH of concentrated acid hydrolysis lignin using Ru/C catalyst at 350° C. for 60 min and a 1:3 formic acid-to-lignin mass ratio. In a recent study, selective depolymerization of lignin to alkylphenols via CTH was reported on lignin rich residues recovered from cholinium lysinate IL pretreatment using Ru/C catalyst in IPA at 300° C. Several nanoparticles (FeB, NiB, and FeNiB) were applied for CTH of organosolv lignin in supercritical ethanol at 320° C. Results suggest that in presence of FeNiB alloy, the number-average molecular weight of lignin was reduced from 1800 Da to 317 Da, producing monomeric phenols with intact deoxygenated aliphatic side chains. CTH of alkaline lignin using Pd/C catalyst combined with metal chlorides at 260° C. was investigated and results suggest that 24% of phenolic monomers was produced using CrCl3 catalyst; however when combining with Pd/C catalyst the phenolic monomer yield was increased to 28.5%, likely attributed to the interaction of CrCl3 with oxygen electron pair to promote the crack of methoxyl groups. These studies have shed light on using platinum group noble metals and transition metal catalysts in different combinations and on various supports for assisting transfer hydrogenolysis and breakdown of various types of lignins; however the effectiveness of catalysts and CTH conditions on DES extracted lignin has not been investigated.

Biomass sorghum has received increasing attention from the biofuel research community in the last decade. As an attractive energy crop, sorghum is a promising source of biomass feedstock for biofuels because fewer inputs (e.g. nitrogen) and less water are required for growing sorghum when compared with corn production. Forage sorghum feedstock has the potential of producing 530-700 gallons of ethanol per acre as compared to the typical ethanol yield from switchgrass of 310-350 gallons per acre. The lignin fractions in sorghum contain a high abundance of ferulate and p-coumarate moieties in addition to the S/G/H lignin structural units, demonstrating a great potential for upgrading sorghum lignin to high value chemicals for various applications.

With growing interest in using IL and DES for lignin fractionation and depolymerization, it has been demonstrated that certain IL and DES can selectively cleave ether linkages and the process can generate lower and narrowly distributed molecular weight lignin. To achieve the long-term goal of developing an efficient and effective process for lignin depolymerization via IL or DES, it is important to further explore catalytic systems that depolymerize and upgrade lignin in the IL or DES medium.

The invention herein explores lignin valorization in IL and DES via catalysis and biocatalysis. As set forth herein, the methods of the invention provide valorizing lignin from lignocellulosic biomass feedstocks, to low molecular weight chemicals.

SUMMARY OF THE INVENTION

The invention described herein concerns a method for extracting compounds from lignin by contacting a lignin source with an ionic liquid (IL) and a deep eutectic solvent. A catalyst is then added and then after sufficient time for decomposition valorized compounds can be extracted from the solvent mixture.

The catalyst can be a transition metal or oxide thereof, such as copper (Cu), manganese (Mn), magnesium (Mg), cobalt (Co), zinc (Zn), iron (Fe), titanium (Ti), chromium (Cr), and nickel (Ni) or oxides thereof. The catalyst can also be characterized by the general formula of $ABO_3$ where A is a rare earth, alkaline earth, alkali, or large ion cations; and B is cations of transition metals. The catalysts can be a polyoxometalates (POMs) of Group V and VI metal, such as tungsten (W), molybdenum (Mo), vanadium (V), and niobium (Nb).

The catalyst can also be a biocatalyst, including laccases, peroxidases, LMPOs, xylanases, and LigA-G. In instances of the catalyst being a laccase, it can be derived from a fungal, bacterial, archaeal, recombinant source, or combinations thereof. The biocatalyst may also be a lignolytic microbe, such as a yeast, $E.\ coli$, rodoccocus, or engineered microbe that are designed to depolymerizie lignin, or combination thereof.

The lignin source may be from Kraft, organosolv, alkaline, acid, lignosulfate, or combinations thereof.

The process occurs in either a free solution or on a supported surface, such as a membrane, biofilm, zeolite, or metal-organic frameworks (MOFs). The process can occur in a single reaction chamber or in a reactor with a membrane to isolate the by-products.

BRIEF DESCRIPTION OF THE DRAWINGS

FIG. 3a shows residual solids and FIG. 3b shows liquid fractions from the catalytic transfer hydrogenolysis reaction; Reaction conditions: temperature at 270° C., reaction time of 60 min, and catalyst loading of 15%.

FIG. 4a shows sorghum cellulolytic enzyme lignin (CEL), FIG. 4b shows DES extracted lignin (DES-EL), and FIG. 4c shows hydrogenolysis oil (H-Oil).

FIG. 8a shows [$C_2C_1$Im][OAc], FIG. 8b shows [Ch][Lys] and FIG. 8c shows [DEA][$HSO_4$].

FIG. 9a shows Free enzyme, FIG. 9b shows [$C_2C_1$Im][OAc], FIG. 9c shows [Ch][Lys], and FIG. 9d shows [DEA][$HSO_4$].

FIG. 10a shows without ABTS and FIG. 10b shows with ABTS. GGE elutes at ~23 min.

DETAILED DESCRIPTION

The present invention presents a new approach to better extracting valuable compounds from lignin. The method includes contacting lignins with an IL or DES, their combinations, or their aqueous solutions and adding a catalyst and/or a biocatalyst to assist in extracting valorized compounds. Converting lignin into high value chemicals adds revenues for a bio-refinery and helps to improve the economic viability of biofuel production.

Figure 14:
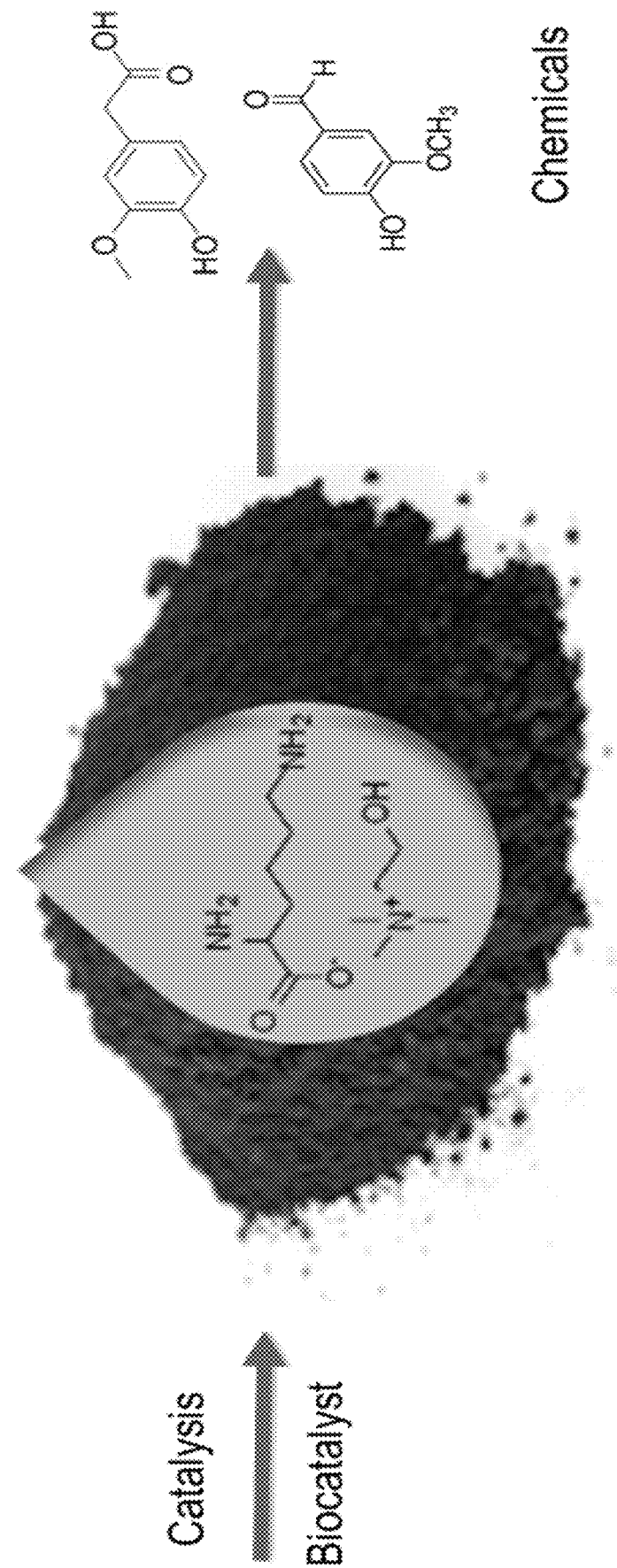
FIG. 14 shows lignin fractionation and upgrading via catalysis and biocatalysis in aqueous ILs.

Ionic liquids (ILs) have received increasing interest because of their potential in fractionating and pretreating lignocellulosic biomass. ILs containing ions made of naturally occurring bases and acids from sugar, protein, and phenolics have recently emerged and proved more biocompatible and less costly compared to petroleum based ILs. The present invention details a new strategy for lignin fractionation and upgrading via catalysis and biocatalysis in aqueous ILs (see FIG. 14).

The method of the present invention concerns application of any ionic liquids and deep eutectic solvents, and combinations thereof. Such can be further mixed with water and/or other solvents (DMSO, hexane, octanol, ethanol, butanol, glycerin, ethyl glycol, acetone, heptane, Tetrahydrofuran, dioxane, etc.). Some exemplary solvents are presented in Table 1 below.

Solvents can also include deep eutectic solvents (DES), including Types 1-IV of DES and may include quaternary ammonium salt and/or a metal chloride hydrate. Exemplary DES are known in the art (Abbott et al. (2004) *Journal of the American Chemical Society* 126(29): 9142-9147; Francisco et al. (2012) *Green Chemistry* 14(8): 2153-2157; Zhang et al. (2012) *Chemical Society Reviews* 41(21): 7108-7146; Dai et al. (2013) *Analytica Chimica Acta* 766: 61-68; Francisco et al. (2013) *Anaewandte Chemie international edition* 52(11): 3074-3085; Florindo et al. (2014) *Acs Sustainable Chemistry & Engineering* 2(10): 2416-2425; Alvarez-Vasco et al. (2016) *Green Chemistry* 18(19): 5133-5141; Kumar, et al. (2016) *Environmental Science and Pollution Research* 23(10): 9265-9275; Li et al. (2017) *Green Chemistry* 19(7): 1628-1634; Li et al. (2017) *International journal of molecular sciences* 18(11): 2266; Loow et al. (2017) *Cellulose* 24(9): 3591-3618; Tang et al. (2017) *ChemSusChem* 10(13): 2696-2706; Kim et al. (2018) *Green Chemistry* 20: 809-815).

The present invention comprises introducing a catalyst to assist in breaking lignin in an ionic liquid down into simpler chemical compounds. The catalyst may be a metal catalyst or an enzymatic catalyst or combinations thereof. The catalyst may be a biocatalyst. In certain embodiments, the catalyst works via catalytic transfer hydrogenolysis (CTH) or by oxidation.

Metal catalysts can include, but are not limited to transition metal oxides, such as Cu, Mn, Mg, Co, Zn, Fe, Ti, Cr, and Ni. Several structures of composite metal oxides, such as perovskite-type, rutile, wurtzite, and chalcopyrite, have been demonstrated as effective catalysts for oxidation reactions. Perovskite-type oxides are characterized by the general formula of $ABO_3$ where A are rare earth, alkaline earth, alkali, or large ions cations; B cations are transition metals. Another popular/potential category for oxidation reaction is using polyoxometalates (POMs) from Gr V and VI, particularly W, Mo, V, and Nb.

The present invention includes biocatalysts as the catalyst. In some embodiments, the biocatalyst includes a lignolytic enzyme, such as a laccases (including from fungal, bacterial, archaeal, recombinant sources), peroxidases, lytic polysaccharide monooxygenases (LPMO), xylanases, and bacterial lignolytic enzymes such as LigD (Cα-dehydrogenase), UigL, LigF (β-etherase), LigE, LigG (glutathione lyase) and LigO, etc.

In some other embodiments, the biocatalyst comprises a lignolytic microbe, including fungi, bacteria, and Achaea, and engineered microbes that are designed to depolymerize lignin. The lignolytic bacteria include *E. coli, bacillus, Streptomyces*, and *Rhodococcus* species.

The present invention also provides for application of the ionic liquid/catalyst system in a free solution and/or on a supported surface, such as membrane, biofilm, zeolite, MOF, solid metal support, etc.

The present invention involves methods to breakdown lignin into simpler and more valuable compounds. The lignin may be from any known lignin sources, including, but not limited to, Kraft, organosolv, alkaline, acid, lignosulfate, milled wood lignin, pyrolytic, steam explosion etc. and combinations thereof.

The present invention further comprises varying approaches to follow or combine the steps in lignin valorization. The steps described herein do not require a strict series of steps and reactions in order to obtain the desired final products. For example, different reactor configurations can be utilized, such as batch/continuous, since stage/multiple stage, flow-through, one-pot, membrane reactor, etc. The steps of the present invention can occur under varying conditions, for example, the pH of the reaction can range from 1-12, the temperature can range from 20-200° C. and the pressure can range from 0-200 psi.

As seen in the Examples below, a portfolio of ILs were synthesized, characterized, and screened for lignin solubility and selectivity on lignin depolymerization. The stability and activity of commercial fungal and plant laccases were evaluated in different concentrations of ILs. Results suggest that certain ILs are fully compatible with laccases; while some appear as un-competitive inhibitors. Immobilization of laccase on solid matrix, i.e. membrane surface helped to retain the enzyme activity and overcome the inhibition effects. A catalytic oxidation route in ILs was also explored by screening a range of metal catalysts and oxidizing agents. Molecular weight distribution of lignin fraction was followed using gel permeation chromatography while the oxidation products such as vanillic acid, syringaldehyde, and syringic acid were identified and quantified using a gas chromatography mass spectrometry (GC-MS). Cleavage of the lignin structures was further investigated by nuclear magnetic resonance spectroscopy (NMR) to understand the plausible oxidation mechanisms. This invention provides a new approach for lignin valorization with improved yield and selectivity of catalyst towards product formation as compared to the other thermochemical and biological lignin upgrading methods. In situ lignin conversion in IL helps to tackle the challenges associated with IL recycle and recovery.

The method of the present invention comprises utilizing aqueous ionic liquids. Exemplary ionic liquids and their common applications are listed in Table 1. More detailed information on the application of ILs and DESs can be found in previously reported reviews (van Rantwijk et al. (2007) *Chemical Reviews* 107(6): 2757-2785; Francisco et al. (2012) *Green Chemistry* 14(8): 2153-2157; Wang et al. (2012) *Chemical Society Reviews* 41(4): 1519-1537; Brandt, et al. (2013) *Green Chemistry* 15(3): 550-583; Francisco et al. (2013) *Angewandte Chemie international edition* 52(11): 3074-3085; Paiva et al. (2014) *ACS Sustainable Chemistry & Engineering* 2(5): 1063-1071; Hijo et al. (2016) *ACS sustainable chemistry* 4 (10), 5347-5369; Tang et al. (2017) *ChemSusChem* 10(13): 2696-2706).

TABLE 1

List of ILs and type of biomass feedstocks where lignin can be derived

| Ionic Liquids | Application |
|---|---|
| 1-butyl-3-methylimidazolium chloride, [$C_4C_1$im][Cl] | Corn stover (an agricultural residue) and poplar (hard wood) |
| 1-butyl-3-methylimidazolium hexafluorophosphate, [$C_4C_1$im][$PF_6$] | |
| 1-ethyl-3-methylimidazolium chloride, [$C_2C_1$im][Cl] | |
| 1-ethyl-3-methylimidazolium hexafluorophosphate, [$C_2C_1$im][$PF_6$] | |
| 1-ethyl-3-methylimidazolium tetracyanoborate, [$C_2C_1$im][$BF_4$] | |
| ethylammonium nitrate, [$EtNH_3$][$NO_3$] | electrochemical |
| 1-benzylpyridinum chloride | Dissolving cellulose |
| 1-ethylpyridinum chloride | |
| 1-butyl-1-methyl-pyrrolidinium, [$C_4$py][Cl—$AlCl_3$] | electrochemical |
| 1,3-dialkylimidazolium | electrochemical |
| 1-ethyl-3-methylimidazolium | electrochemical |
| 1-butyl-3-methylimidazolium chloride | Dissolving cellulose |
| 1-ethyl-3-methylimidazolium acetate, [$C_2$mim][OAc] | Lignin dissolution |
| 1-butyl-3-methylimidazolium chloride, [$C_4C_1$im][Cl] | Wood chips |
| 1-Allyl-3-methylimidazolium chloride | Ball-milled Southern pine powder |
| 1-Allyl-3-methylimidazolium chloride | Norway spruce sawdust |
| 1-Allyl-3-methylimidazolium chloride | Norway spruce sawdust |
| 1-Allyl-3-methylimidazolium chloride | Norway spruce TMP |
| 1-Allyl-3-methylimidazolium chloride | Southern pine TMP |
| 1-Allyl-3-methylimidazolium chloride | Southern pine TMP |
| 1-butyl-3-methylimidazolium chloride, [$C_4C_1$im][Cl] | Southern pine TMP |
| Benzyl methylimidazolium chloride | Southern pine TMP |
| Benzyl methylimidazolium chloride | Norway spruce TMP |
| Methoxy Benzyl methylimidazolium chloride | Southern pine TMP |
| Methoxy Benzyl methylimidazolium chloride | Southern pine TMP |
| Benzyl methylimidazolium Dca | Southern pine TMP |
| 1-ethyl-3-methylimidazolium acetate, [$C_2C_1$im][OAc] | Avicel |
| 1-ethyl-3-methylimidazolium acetate, [$C_2C_1$im][OAc] | A-Cellulose |
| 1-butyl-3-methylimidazolium acetate, [$C_4C_1$im][OAc] | MCC |
| 1-ethyl-3-methylimidazolium acetate, [$C_2C_1$im][OAc] | Corn stover |
| 1-ethyl-3-methylimidazolium acetate, [$C_2C_1$im][OAc] | Maple wood |
| 1-ethyl-3-methylimidazolium acetate, [$C_2C_1$im][OAc] | Triticale straw |
| 1-ethyl-3-methylimidazolium acetate, [$C_2C_1$im][OAc] | Switchgrass |
| 1-ethyl-3-methylimidazolium acetate, [$C_2C_1$im][OAc] | *Miscanthus* (20% $H_2O$) |
| 1-ethyl-3-methylimidazolium acetate, [$C_2C_1$im][OAc] | Triticale straw (50% $H_2O$) |
| 1-ethyl-3-methylimidazolium acetate, [$C_2C_1$im][OAc] | Willow (20% $H_2O$) |
| 1-ethyl-3-methylimidazolium acetate, [$C_2C_1$im][OAc] | Pine (20% $H_2O$) |
| 1-ethyl-3-methylimidazolium acetate, [$C_2C_1$im][OAc] | Energy cane |
| 1-Butyl-3-methylimidazolium methyl sulfate, [$C_4C_1$im][$MeSO_4$] water solution | *Miscanthus* |
| 1-Butyl-3-methylimidazolium hydrogen sulfate, [$C_4C_1$im][$HSO_4$] water solution | *Miscanthus* |
| 1-Butyl-3-methylimidazolium methyl sulfate, [$C_4C_1$im][$MeSO_4$] water solution | Sugarcane bagasse |

TABLE 1-continued

List of ILs and type of biomass feedstocks where lignin can be derived

| Ionic Liquids | Application |
|---|---|
| 1-Butyl-3-methylimidazolium hydrogen sulfate, [$C_4C_1$im][$HSO_4$] water solution | Miscanthus |
| 1-Butyl-3-methylimidazolium hydrogen sulfate, [$C_4C_1$im]$HSO_4$] water solution | Willow |
| 1-Butyl-3-methylimidazolium hydrogen sulfate, [$C_4C_1$im]$HSO_4$] water solution | Pine |
| 1-Butyl-3-methylimidazolium methyl sulfate, [$C_4$Him][$MeSO_3$] water solution | *Miscanthus* |
| 1-Butyl-3-methylimidazolium hydrogen sulfate, [$C_4C_1$im][$HSO_4$] water solution | *Miscanthus* |
| 1-butyl-3-methylimidazolium chloride, [$C_4C_1$im][Cl] water solution | *Miscanthus* |
| 1-butyl-3-methylimidazolium chloride, [$C_4C_1$im][Cl] | Triticale straw |
| 1-butyl-3-methylimidazolium chloride, [$C_4C_1$im][Cl] water solution | Legume straw |
| cholinium chloride, [Ch][Cl] | various biomass |
| cholinium lysinate, [Ch][Lys] | various biomass |
| cholinium acetate, [Ch][Ac] | various biomass |
| cholinium glutamate, [Ch][Glu] | various biomass |
| cholinium succinate, [Ch][Sc] | various biomass |
| diethyl ammonium sulfate, [DEA][SO4] | various biomass |
| diethyl ammonium hydrogen sulfate, [DEA][HSO4] | various biomass |
| Triethylammonium hydrogen sulfate, [TEA][HSO4] | various biomass |
| Triethylammonium acetate, [TEA][Ac] | various biomass |
| Triethylammonium hydrogen sulfate, [TEA][HSO4] | various biomass |

TABLE 2

List of DESs and type of biomass feedstocks where lignin can be derived

| Deep Eutectic Solvents | Biomass Pretreatment |
|---|---|
| ChCl-ethylene glycol | switchgrass |
| ChCl-acetic acid | rice husk |
| ChCl-sucrose | pine |
| ChCl-imidazole | corncob |
| ChCl-glucose | rice straw |
| ChCl-lactic acid | poplar |
| ChCl-ethylene glycol | sorghum |
| ChCl-glycerol | endocarps |
| ChCl-formic acid | corn stover |
| ChCl-fructose | miscanthus |
| ChCl-lactic acid | oil palm trunk |
| EAC-inulin | |
| ChCl-citric acid | |
| ChCl-oxalic acid | |
| ChCl-citric acid | |
| ChCl-TsOH (tosylic acid) | |
| N,N-diethyl ethanol ammonium chloride, DeeaCl-TsOH (tosylic acid) | |
| (2-Hydroxyethyl)trimethylammonium Citrate, CDHC-glycolic acid (1:1) | |

Note:
'ChCl' stands for cholinium chloride

The method of the present invention further comprises application of a catalyst to the lignin in aqueous IL. Catalysts may include transition metal/oxides including Cu, Mn, Mg, Co, Zn, Fe, Ti, Cr, and Ni. Several structures of composite metal oxides, such as perovskite-type, rutile, wurtzite, and chalcopyrite, have been demonstrated as effective catalysts for oxidation reactions. Perovskite-type oxides are characterized by the general formula of $ABO_3$ where A are rare earth, alkaline earth, alkali, or large ions cations; B cations are transition metals. Another popular/potential category for oxidation reaction is using polyoxometalates (POMs) from Gr V and VI, particularly W, Mo, V, and Nb.

Preliminary examination of the methods described herein focused on investigating the effect of three different ILs, representing distinct solvent properties, on a commercially available fungal laccase (from *Trametes versicolor*) activity using 2,2'-azino-bis(3-ethylbenzothiazoline-6-sulfonic acid (ABTS) assay at varied concentration of laccase and ILs. Preliminary results indicated that [$C_2C_1$Im][OAc] among the 3 tested ILs is more inhibitory to laccase; with 2% [$C_2C_1$Im][OAc] causing significant loss of laccase activity. In contrast, [DEA][HSO4] is compatible with laccase, as indicated by a negligible to modest loss of laccase activity even at 10% concentration. Also tracked were the lignin depolymerization products from Kraft lignin catalyzed by laccase with ABTS as mediator in oxygenated aqueous ILs and demonstrated that vanillin and guaiacol were the major oxidation products with [$C_2C_1$Im][OAc] while vanillic acid became the major product with [Ch][Lys]. Product formation during enzymatic oxidation of lignin is likely dependent on the solvent properties (basicity, acidity and polarity) of the reaction systems. These results lead to the hypothesis that the temperature-dependent solvent properties of IL could serve as a design basis to tune the aqueous IL system for better lignin solubility and product selectivity.

Deep eutectic solvent (DES) is intrinsically cheaper than many ionic liquids (ILs) due to low precursor cost, simple synthesis, and improved recyclability. Meanwhile DES can be as effective as ILs towards dissolving lignin from plant materials. However, the lignin depolymerization mechanism in DES, the structural and chemical properties of DES-extracted lignin (DES-EL), and the possible valorization pathways of DES-EL towards value-added products were not well understood. This study aims to characterize the lignin streams from DES (1:2 choline chloride:lactic acid) treated sorghum and further upgrade the extracted lignin to phenolic compounds. As revealed by HSQC, 13C and 31P NMR analysis, DES cleaved nearly all ether linkages in native lignin, resulting in significant size reduction. We further catalytically upgraded DES-EL to phenolic compounds via catalytic transfer hydrogenolysis in presence of isopropyl alcohol. Among the three tested catalysts (Ru/C, Pd/C, and Pt/C), Ru/C proved the most effective in deconstructing DES-EL, with oil, char, and gas yields of 36.3, 46.4, 17.3 wt %, respectively. Major lignin monomeric products in the oil were phenol, 4-ethylphenol, 4-ethyl-2-methoxyphenol, 2-methoxy-4-propylphenol, and 4-hydroxy-benzenepropanoic acid. This study provides a mechanistic understanding of lignin depolymerization in DES and demonstrates a possible way to catalytic upgrading of DES-EL to low molecular weight phenolic compounds.

As seen in the examples below, the basic premise of the present invention works with a varying array of ILs, catalysts and lignin sources. Those skilled in the art will appreciate that certain variables can be selected in order to drive or increase production of certain compounds from lignin.

REFERENCES

Abbott, A. P., et al. (2004). "Deep eutectic solvents formed between choline chloride and carboxylic acids: versatile alternatives to ionic liquids." *Journal of the American Chemical Society* 126(29): 9142-9147.

Alvarez-Vasco, C., et al. (2016). "Unique low-molecular-weight lignin with high purity extracted from wood by deep eutectic solvents (DES): a source of lignin for valorization." *Green Chemistry* 18(19): 5133-5141.

Beckham, G. T., et al. (2016). "Opportunities and challenges in biological lignin valorization." *Current Opinion in Biotechnology* 42: 40-53.

Brandt, A., et al. (2013). "Deconstruction of lignocellulosic biomass with ionic liquids." *Green Chemistry* 15(3): 550-583.

Chatel, G. and R. D. Rogers (2013). "Review: Oxidation of lignin using ionic liquids An innovative strategy to produce renewable chemicals." *ACS Sustainable Chemistry & Engineering* 2(3): 322-339.

Dai, Y., et al. (2013). "Natural deep eutectic solvents as new potential media for green technology." *Analytica Chimica Acta* 766: 61-68.

Das, L., et al. (2012). "Heterogeneous catalytic oxidation of lignin into value-added chemicals." *Biofuels* 3(2): 155-166.

De Wild, P. J., et al. (2014). "Lignin pyrolysis for profitable lignocellulosic biorefineries." *Biofuels, bioproducts and biorefining* 8(5): 645-657.

Deng, W., et al. (2015). "Oxidative conversion of lignin and lignin model compounds catalyzed by CeO2-supported Pd nanoparticles." *Green Chemistry* 17(11): 5009-5018.

Fernández-Fernández M, M. D., Domínguez A, Sanromán M Á, Tavares A P, Rodríguez O, Macedo E A. (2014). "Stability and kinetic behavior of immobilized laccase from *Myceliophthora thermophila* in the presence of the ionic liquid 1-ethyl-3-methylimidazolium ethylsulfate." *Biotechnology Progress* 30(4): 7.

Florindo, C., et al. (2014). "Insights into the synthesis and properties of deep eutectic solvents based on cholinium chloride and carboxylic acids." *Acs Sustainable Chemistry & Engineering* 2(10): 2416-2425.

Francisco, M., et al. (2012). "New natural and renewable low transition temperature mixtures (LTTMs): screening as solvents for lignocellulosic biomass processing." *Green Chemistry* 14(8): 2153-2157.

Francisco, M., et al. (2013). "Low-transition-temperature mixtures (LTTMs): A new generation of designer solvents." *Angewandte Chemie international edition* 52(11): 3074-3085.

George, A., et al. (2015). "Design of low-cost ionic liquids for lignocellulosic biomass pretreatment." *Green Chemistry* 17(3): 1728-1734.

Guerra, A., et al. (2008). Isolation and characterization of lignins from *Eucalyptus grandis* Hill ex Maiden and *Eucalyptus globulus* Labill. by enzymatic mild acidolysis (EMAL). *Holzforschung*. 62: 24.

Henriksson, G. (2007). *Lignin*. Stockholm, K T H.

Hijo, T., et al. (2016). "Applications of ionic liquids in the food and bioproducts industries." *ACS sustainable chemistry*.

Jia, S., et al. (2010). "Cleaving the β O 4 Bonds of Lignin Model Compounds in an Acidic Ionic Liquid, 1-H-3-Methylimidazolium Chloride: An Optional Strategy for the Degradation of Lignin." *ChemSusChem* 3(9): 1078-1084.

Kim, K. H., et al. (2018). "Biomass Pretreatment using Deep Eutectic Solvent from Lignin derived Phenols." *Green Chemistry*.

Kumar, A. K., et al. (2016). "Natural deep eutectic solvent mediated pretreatment of rice straw: bioanalytical characterization of lignin extract and enzymatic hydrolysis of pretreated biomass residue." *Environmental Science and Pollution Research* 23(10): 9265-9275.

Laskar, D. D., et al. (2013). "Pathways for biomass-derived lignin to hydrocarbon fuels." *Biofuels, bioproducts and biorefining* 7(5): 602-626.

Li, Q., et al. (2017). "Quality carbon fibers from fractionated lignin." *Green Chemistry* 19(7): 1628-1634.

Li, T., et al. (2017). "Deep Eutectic Solvents (DESs) for the Isolation of Willow Lignin (*Salix matsudana* cv. Zhuliu)." *International journal of molecular sciences* 18(11): 2266.

Linger, J. G., et al. (2014). "Lignin valorization through integrated biological funneling and chemical catalysis." *Proceedings of the National Academy of Sciences* 111(33): 12013-12018.

Liu, E., et al. (2017). "Impact of Dilute Sulfuric Acid, Ammonium Hydroxide, and Ionic Liquid Pretreatments on the Fractionation and Characterization of Engineered Switchgrass." *BioEnergy Research*.

Loow, Y.-L., et al. (2017). "Potential use of deep eutectic solvents to facilitate lignocellulosic biomass utilization and conversion." *Cellulose* 24(9): 3591-3618.

Mottiar, Y., et al. (2016). "Designer lignins: harnessing the plasticity of lignification." *Current Opinion in Biotechnology* 37: 190-200.

Mu, W., et al. (2013). "Lignin pyrolysis components and upgrading-technology review." *BioEnergy Research* 6(4): 1183-1204.

Paiva, A., et al. (2014). "Natural deep eutectic solvents-solvents for the 21st century." *ACS Sustainable Chemistry & Engineering* 2(5): 1063-1071.

Prado, R., et al. (2016). "Lignin oxidation and depolymerisation in ionic liquids." *Green Chemistry* 18(3): 834-841.

Ragauskas, A. J., et al. (2014). "Lignin Valorization: Improving Lignin Processing in the Biorefinery." *Science* 344(6185).

Rehmann, L., et al. (2012). "Measuring the effect of ionic liquids on laccase activity using a simple, parallel method." *Green Chemistry* 14(3): 725-733.

Rinaldi, R., et al. (2016). "Paving the way for lignin valorisation: recent advances in bioengineering, biorefining and catalysis." *Angewandte Chemie International Edition* 55(29): 8164-8215.

Studer, M. H., et al. (2011). "Lignin content in natural *Populus* variants affects sugar release." *Proceedings of the National Academy of Sciences* 108(15): 6300-6305.

Sun, J., et al. (2017). "Molecular Mechanisms Underlying Inhibitory Binding of Alkylimidazolium Ionic Liquids to Laccase." *Molecules* 22(8): 1353.

Tang, X., et al. (2017). "Green processing of lignocellulosic biomass and its derivatives in deep eutectic solvents." *ChemSusChem* 10(13): 2696-2706.

Trott, O. and A. J. Olson (2010). "AutoDock Vina: Improving the speed and accuracy of docking with a new scoring function, efficient optimization, and multithreading." *Journal of Computational Chemistry* 31(2): 455-461.

van Rantwijk, F. and R. A. Sheldon (2007). "Biocatalysis in Ionic Liquids." *Chemical Reviews* 107(6): 2757-2785.

Wang, H., et al. (2012). "Ionic liquid processing of cellulose." *Chemical Society Reviews* 41(4): 1519-1537.

Wilkerson, C., et al. (2014). "Monolignol ferulate transferase introduces chemically labile linkages into the lignin backbone." *science* 344(6179): 90-93.

Zakzeski, J., et al. (2010). "The catalytic valorization of lignin for the production of renewable chemicals." *Chemical reviews* 110(6): 3552-3599.

Zhang, Q., et al. (2012). "Deep eutectic solvents: syntheses, properties and applications." *Chemical Society Reviews* 41(21): 7108-7146.

EXAMPLES

Material and Methods
Materials

Biomass sorghum (Sorghum bicolor, forage variety ES5200) was provided by the Bioenergy Feedstock Library, Idaho National Laboratory (Idaho Falls, Id.). Air dried sorghum sample was grounded to pass a 2 mm sieve using a model 4 Wiley mill, and stored in Ziploc bags at room temperature for subsequent experiments. Isopropyl alcohol, Ru/C (5 wt % Ru), choline chloride, and lactic acid were purchased from TCI America, whereas acetone, ethanol, Pd/C (5 wt % Pd) and Pt/C (5 wt % Pt) were purchased and used as is from Sigma-Aldrich.

Pretreatment and Lignin Recovery

DES was prepared by mixing choline chloride and lactic acid in its solid state in a molar ratio of 1:2, followed by heating the mixture with constant stirring at 65° C. for 2 h in an oil bath as described elsewhere. The mixture was stirred until no solids left, leading to a final transparent liquid (DES). The DES was cooled down and kept in a desiccator for further use.

Pretreatment of sorghum was performed by mixing 2 g of biomass with 18 g of DES (10 wt % solid loading) in a glass pressure tube reactor. The pressure tubes were then sealed, and the contents of the tubes were stirred at 200 rpm at 145±2° C. in a temperature controlled oil bath for 6 h, according to a previous report. The pretreated biomass was washed with 20 mL ethanol and then manually squeezed through a 0.074 mm nylon filter (200 mesh) to separate the solids from the pretreatment liquid. Lignin was precipitated from the pretreatment liquid by adding water to the liquid until reaching a water: ethanol ratio of 1:2. Precipitated lignin was further purified, namely DES extracted lignin (DES-EL), by washing 3 times with a 9:1 water/ethanol mixture and then freeze-dried for future use. All the experiments were performed in duplicates.

Lignin Depolymerization by Catalytic Transfer Hydrogenolysis

Lignin depolymerization was carried out in a 100 mL Parr reactor (4593 bench top reactor, Alloy C276, Parr Instruments, IL). In a typical reaction, 0.5 g of lignin and 20 mL of isopropyl alcohol (IPA) was added to the reactor; subsequently 0.01-0.1 g (2-20 wt %) of Pt/C, Ru/C, or Pd/C catalyst was added to the reactor. After purging the reactor with nitrogen, the reaction was carried out at 270° C. for 1 h at 250 rpm stirring speed. The heat-up time for reactor to reach set reaction temperature was approximately 35 min, which was not included in the reaction time. After reaction, the reactor was removed from the heating mantle and quenched rapidly at first by forced air and then in an ice bath to prevent undesirable secondary reactions.

Once the reactor was cooled, gas was collected in a 1 L Tedlar® gas sampling bag (CEL Scientific, Cerritos, Calif.); while liquid and solid residues were transferred to a beaker by washing the reactor content with acetone. Separation of liquid and solid residues were performed by centrifugation at 8000 rpm for 15 min. The acetone and IPA were removed from the liquid fraction in a vacuum oven at 20° C. for 24 h. After drying, the leftover liquid oil was weighed to estimate the oil yield (eq. 1). The oil was re-dissolved in 2-methyltetrahydrofuran (MeTHF) for GC-MS analysis. The residual solid was further washed with 15 ml of acetone for 3 times and then dried at 80° C. for 24 h to determine the solid yield (eq. 2). Oil Yield Analytical Methods Identification of the lignin depolymerization products from the CTH reaction were performed by Agilent 7890B GC coupled 5977B MS with a HP-5MS (60 m×0.32 mm) capillary column. The temperature program started at 50° C. and increased to 120° C. at 10° C. min-1 with a holding time of 5 min; then it was raised to 280° C. at 10° C. min-1 with a holding time of 8 min and to 300° C. at 10° C. min-1 with holding time of 2 min. Helium was used as a carrier gas with a flow rate of 1.2 mL min-1. Calibration curves were created using commercially available pure compounds: guaiacol (C6), vanillin (C6C1), syringaldehyde (C6C2) and 4-propylphenol (C6C3) (Sigma Aldrich, St. Louis, Mo., USA). The effluent gases from hydrogenolysis were analyzed using a Micro GC (HP, Quad series, Refinery Gas analyzer) equipped with a TCD detector. Calibration curves were generated using pure C1-C7 olefins, H2, CH4, CO, and CO2.

Lignin Characterization

Gel permeation chromatographic (GPC) analysis: The weight-average molecular weight (Mw) and number-average molecular weight (Mn) of the lignin samples were determined by GPC. The samples were first acetylated using acetic acid and acetyl bromide as previously described. An Ultimate 3000 HPLC system (Dionex Corporation, Sunnyvale, Calif.) equipped with an ultraviolet (UV) detector was used. Separation was accomplished in a mobile phase of THF at a flow rate of 0.5 ml min-1, with a Mixed-D PLgel column (5 μm particle size, 300 mm×7.5 mm i.d., linear molecular weight range of 200 to 400,000 u, Polymer Laboratories, Amherst, Mass.) at 50° C. Elution profile of materials eluting from the column were calibrated using low molecular weight polystyrene standards (Product No. 48937, Sigma-Aldrich) at UV absorbance of 280 nm.

Fourier transform infrared (FTIR) spectroscopic analysis: FTIR was performed by using a Thermo Nicolet Nexus 870 FT-IR ESP to examine the chemical structure alternations of the lignin samples. Samples were pressed to 12 psi using a spring loaded jack onto the ATR crystal.

Sample spectra were obtained using an average of 64 scans between 400 and 4000 cm-1 with a spectral resolution of 1.928 cm-1. The raw FTIR spectra were baseline corrected and normalized using Omnic 6.1a software and compared in the range 750-4000 cm-1.

Cellulolytic enzyme lignin (CEL) isolation: Cellulolytic enzyme lignin (CEL) was isolated from the toluene/ethanol (2/1 by volume) extracted sorghum according to the published literature procedure. In brief, the extractives-free samples were loaded to 50 mL ZrO2 grinding jar (including 10×10 ball bearings) in Retsch Ball Mill PM 100. The biomass was then ball milled at 550 rpm in a frequency of 5 min with 5 min pauses in-between for 1.5 h total time.

The milled fine cell wall powder was then subjected to enzymatic hydrolysis with a mixture (1:1 by volume) of Cellic® CTec2 and HTec2 (gifts from Novozymes) in 5 mM citrate buffer (pH 4.8, 50° C.) under continuous agitation at 200 rpm for 48 h. The residue was isolated by centrifugation and was hydrolyzed once more with freshly added enzymes mixture. The residue obtained was rich in lignin and was washed with deionized water, centrifuged, and freeze dried.

The lignin-enriched residue was extracted with dioxane-water (96% v/v, 10.0 mL/g biomass) for 24 h. The extracted mixture was centrifuged, and the supernatant was collected. p-Dioxane extraction was repeated once by adding fresh p-dioxane-water. The extracts were combined, roto-evaporated to reduce the volume at less than 45° C., and freeze dried. The obtained lignin samples, designated as CEL, was used for further analysis.

Nuclear Magnetic Resonance (NMR) Spectroscopic Analysis:

NMR spectra of lignin samples and hydrogenolysis products were acquired in a Bruker Avance III HD 500-MHz spectrometer and spectral processing was carried out using a Bruker Topspin 3.5 (Mac) software. CEL (20 mg) and hydrogenolysis product (9 mg) were dissolved in 100 mg DMSO-d6 in a micro-NMR tube independently. DES lignin (40 mg) was dissolved in 0.5 mL DMSO-d6 in 5-mm NMR tube. Heteronuclear single quantum coherence (HSQC) experiments were carried out with a Bruker pulse sequence (hsqcetgpspsi2.2) on a N2 cryoprobe (BBO 1H&19F-5 mm) with the following acquisition parameters: spectra width 12 ppm in F2 (1H) dimension with 1024 data points (acquisition time 85.2 ms), 166 ppm in F1 (13C) dimension with 256 increments (acquisition time 6.1 ms), a 1.0-s delay, a 1J C—H of 145 Hz, and 128 scans. The central DMSO-d6 solvent peak (6C/6H at 39.5/2.49) was used for chemical shifts calibration. Assignment and the relative abundance of lignin compositional subunits and interunit linkage were estimated using volume integration of contours in HSQC spectra according to published literature. For volume integration of monolignol compositions of syringyl (S), guaiacyl (G), p-hydroxyphenyl (H), p-coumarate (pCA), and ferulate (FA), the cross peaks of 52/6, G2, H2/6, pCA 2/6, and FA2 contours were used with G2 and FA2 integrals doubled were integrated. The T2'/6' of tricin (T) was used for quantification of tricin. The Cα signals were used for volume integration for inter-unit linkages estimation. The abundances of aromatics and side-chain linkages were presented as percentage of total SGH units and total side-chain linkages, respectively. The 31P NMR spectra of lignin and hydrogenolysis products were measured after derivatization with 2-chloro-4,4,5,5-tetramethyl-1,3,2-dioxaphospholane (TMDP). The spectra of phosphitylated compounds were acquired using an inverse-gated decoupling pulse sequence (Waltz-16), 90° pulse, 25-spulse delay with 64 scans. All chemical shifts reported are relative to the product of TMDP with water, which has been observed to give a sharp signal in pyridine/CDCl3 at 132.2 ppm. The 13C NMR acquisition was performed using a 90° pulse with an inverse-gated decoupling pulse sequence, a 2.0-s pulse delay, and 30,000 scans at 27° C.

Approximately 0.01 mg/mL chromium acetylacetonate was added to decrease relaxation time.

Results and Discussion

Pretreatment and Lignin Recovery

The chemical composition of sorghum was determined following NREL standard protocol and its compositions (wt %) are: glucan 35.2±0.1, xylan 22.1±0.1, lignin 18.3±0.1, extractives 15.6±0.7, and others 8.8±0.4. The glucan, xylan and lignin contents of sorghum are comparable to other lignocellulosic biomass, such as corn stover and switchgrass. Several studies have reported fractionation of sorghum using different pretreatment methods such as dilute acid and alkaline pretreatments. Under the condition tested in this work, the amount of lignin recovered from the liquid fraction following DES pretreatment was 14.3 g (78%) on basis of 100 g of initial biomass. It was shown that a simple precipitation and washing method using ethanol-water was effective for obtaining high lignin yield and purity. A composition analysis of the extract DES lignin (DES-EL) demonstrated very high purity (>97%), with only trace amounts of carbohydrates and residual DES (based on lactic acid content), and very low ash content (<1%). These results are comparable to a previous report on choline chloride/lactic acid (ChCl:Lac) based DES pretreatment of woody biomass where lignin yields were 78% for poplar and 58% for Douglas fir, respectively, using 1:2 of ChCl:Lac. Moreover, the extracted lignin has 95% purity with low and narrowly distributed molecular weight. In another study, Kumar et al. 2015 used betaine/lactic acid (B:Lac) and ChCl:Lac at different molar ratios for extraction of enabling the hydrogenolysis reaction. In presence of Ru/C catalyst, the gas products consisted of a higher (71.47) relative mol % of hydrogen gas as compared to 57.30 mol % and 64.15 mol % for Pt/C and Pd/C, respectively, which corroborates the higher oil yield obtained with Ru/C catalyst.

In addition to hydrogen, other gaseous products included methane, carbon monoxide, carbon dioxide, n-propane, and propylene. These gaseous products may be derived from cracking of the side chain of the lignin. In general, gas product yields increased with increase in reaction time irrespective of the catalyst loading and reaction temperature, with the highest hydrogen release was observed in presence of Ru/C catalyst, which is consistent with a previous study on CTH of organosolv lignin.

GPC and FTIR Characterization of Lignin Streams

Figure 1:
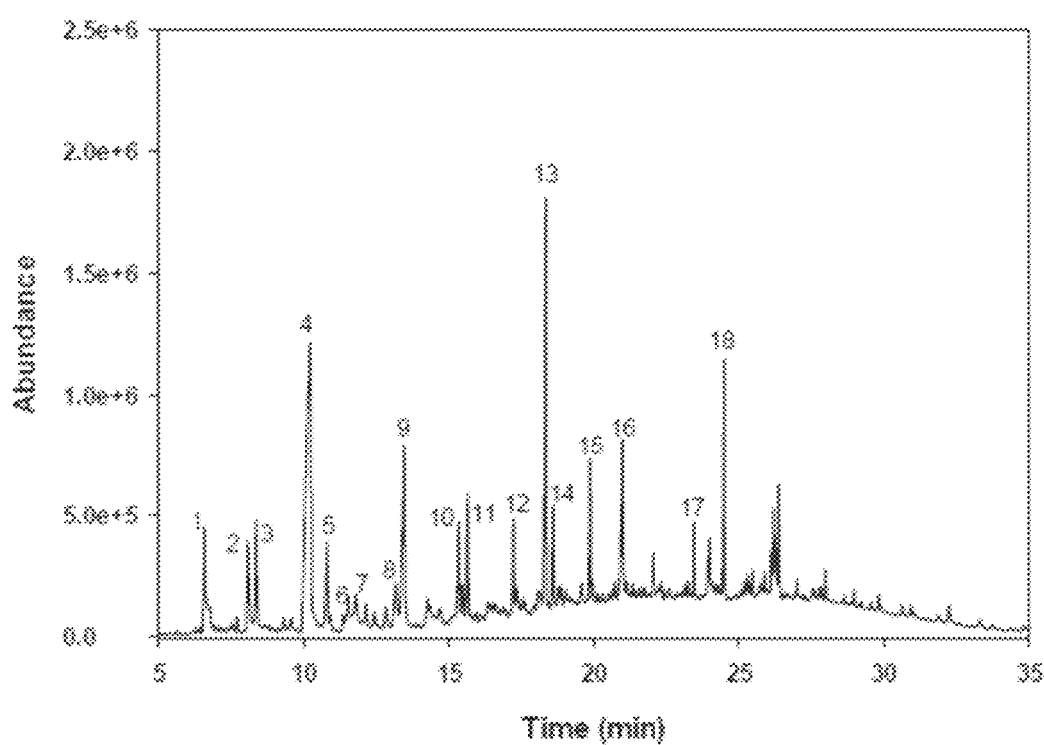
FIG. 1 shows a representative GC-MS profile showing lignin breakdown products in the liquid oil recovered from catalytic transfer hydrogenolysis of DES extracted lignin. Reaction conditions: temperature at 270° C., reaction time of 60 min, and catalyst (Ru) loading of 15%.
Figure 2:
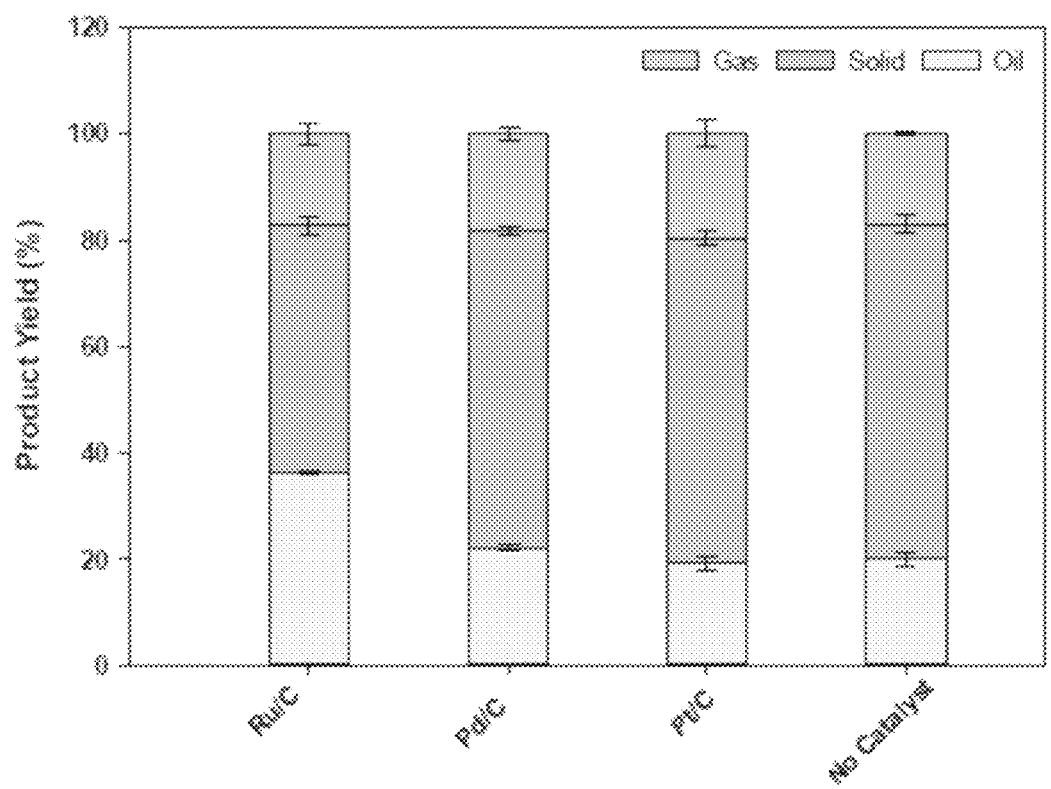
FIG. 2 shows the effect of catalyst on the distribution of reaction products at temperature of 270° C., reaction time of 60 min, and catalyst loading of 15%.
Figure 3A:
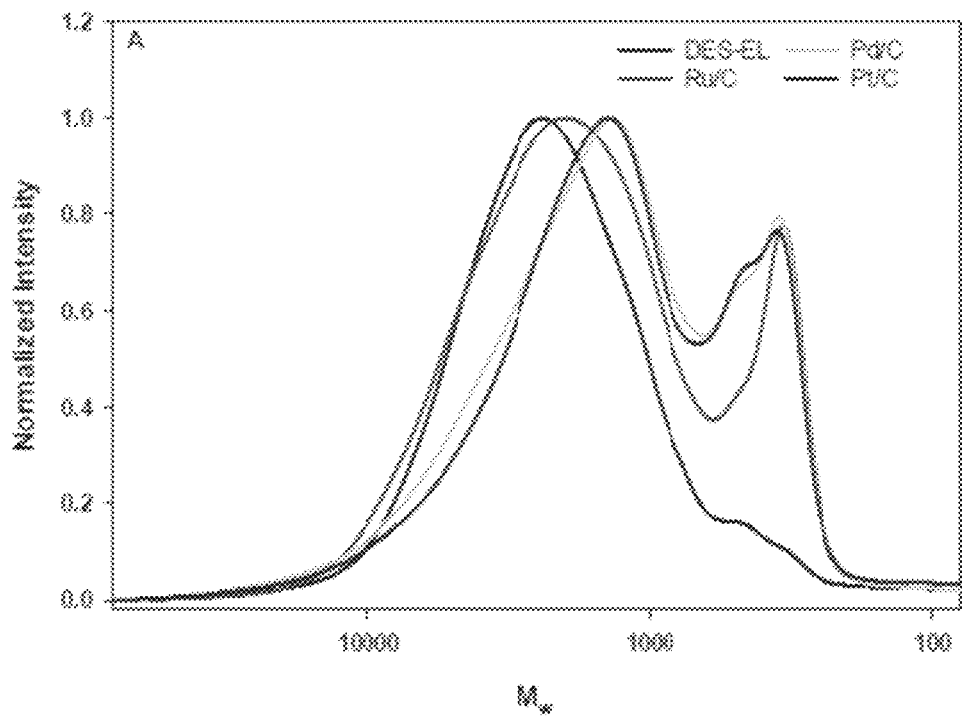
FIGS. 3a and 3b show the molecular weight distribution of unreacted DES-EL.

Large molecular weight (MW) phenolics, which were undetectable in the GC-MS analysis due to their low volatility can be captured via GPC. Hence, GPC analysis was performed to investigate the molecular weight distribution of the unreacted DES-EL, the solid residues and the liquid fraction after CTH. FIG. 3a shows the GPC chromatograms of acetylated solid residues and liquid fractions after CTH reaction catalyzed by Ru/C, Pd/C, and Pt/C in comparison with the unreacted DES-EL. Molecular weight distribution (MWD) of the solid residues from all the three catalysts shifted to the right (i.e., lower MW) than the unreacted DES-EL. The average MW of the DES-EL was 3037.1 g/mol; whereas the average MW of Ru/C, Pd/C, and Pt/C catalyzed lignin residues were 2593.4, 2363.1, and 2182.7 g/mol, respectively (Table 3).

TABLE 3

The molecular weight distribution of residual solid and liquid fractions derived from hydrogenolysis of DES-EL at 270° C., 60 min reaction time and 15% catalyst loading.

| Source | $M_w$ (g/mol) | $M_n$ (g/mol) | Polydispersity index (PDI) |
|---|---|---|---|
| DES Lignin | 3037.05 | 1114.18 | 2.73 |
| Residual Lignin (Ru/C) | 2539.44 | 841.33 | 3.02 |
| Residual Lignin (Pd/C) | 2363.14 | 752.80 | 3.14 |
| Residual Lignin (Pt/C) | 2182.73 | 669.68 | 3.23 |
| Lignin in liquid stream (Ru/C) | 681.62 | 478.08 | 1.43 |
| Lignin in liquid stream (Pd/C) | 570.15 | 455.45 | 1.25 |
| Lignin in liquid stream (Pt/C) | 704.97 | 497.46 | 1.42 |

The decrease in average MW of solid residues indicates lignin depolymerization caused by CTH reaction. The polydispersity index (PDI=2.73) of DES-EL was however lower than the PDIs (in the range of 3.02-3.23) of solid residues for all three catalysts.

Figure 3B:
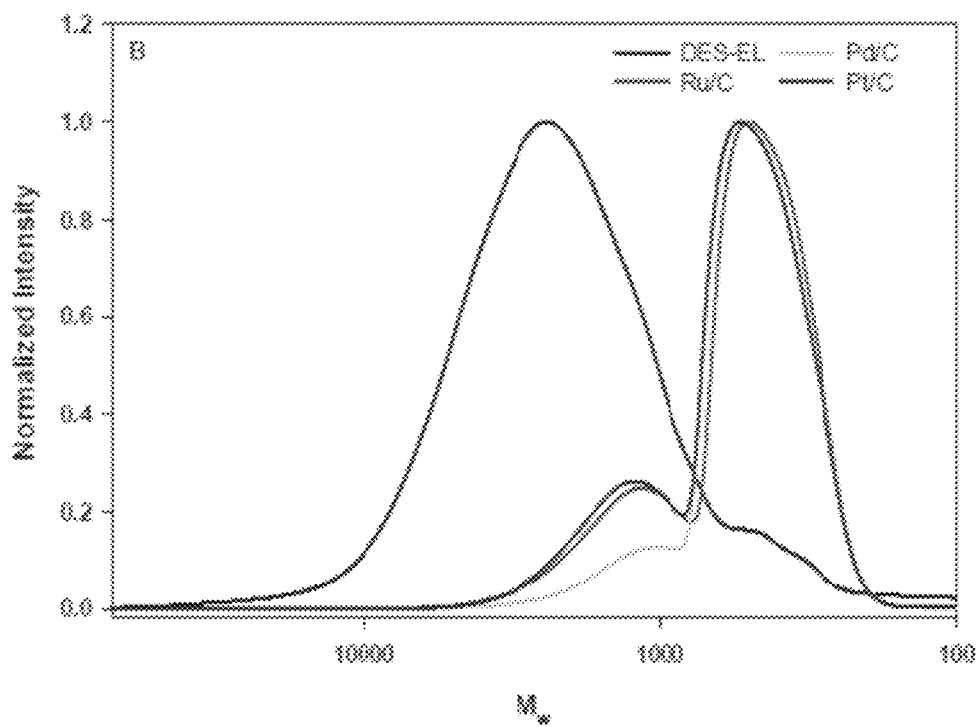

The increase in PDI for the residual solids demonstrated a wider span of MW after CTH reaction, suggesting that lignin depolymerization and recondensation may occur at the same time. The liquid fractions had much lower MW than the unreacted DES-EL, with an overall MW between 570.2-705.0 g/mol (see FIG. 3b). The MWD curves of the liquid fractions for all the catalysts showed very similar peak shapes, with PDI ranging from 1.25-1.43. The reductions in MW for both acetylated solid residues and liquid fractions in presence of catalysts indicate the depolymerization of DES-EL due to CTH reaction. Combining the GPC profiles and GC/MS results, it can be inferred that CTH was effective in breaking down DES-EL to lower MW phenolic compounds.

The ATR-IR spectra of the unreacted DES-EL and the solid residues after hydrogenolysis are shown in Figure S1. Generally speaking, the IR spectra of the solid residues were significantly different from the IR spectrum of the unreacted DES lignin. The peaks at 3400 and 2920 cm-1 represent the stretching of O—H and CHn bonds, respectively. The decrease in absorbance in the 3400 cm-1 region for the solid residues can be attributed to the reduction of hydroxyl groups during hydrogenolysis. The aromatic skeletal vibrations were represented by signals between 1400 and 1700 cm-1 while the bands at 1510 and 1595 cm-1 can be assigned to C=C of aromatic skeletal vibrations. It appeared that the bands around 1595 cm-1 were retained for all the solid residues derived from hydrogenolysis, suggesting that the aromatic ring was not saturated by the hydrogenolysis.

The peaks at 1420 and 1460 cm-1 can be attributed to the C—H aromatic ring vibrations and C—H deformation in CHn groups, respectively; while the hydrogenolysis solid residue showed notable decrease or no absorbance for these peaks when compared to untreated DES-EL. Additionally, the spectra at 1030, 1110, and 1220 cm-1 correspond to guaiacyl (G) and syringyl (S) units of lignin; all solid residues showed significant reduction in absorbance in this range as compared with unreacted DES lignin. Collectively, the FTIR results on the residual solids illustrate that during CTH reaction, a portion of the DES-EL lost its original structure and was most likely condensed to char-like materials; while the other portion depolymerized to lower molecular weight products as shown by GPC and GC/MS results.

Figure 4A:
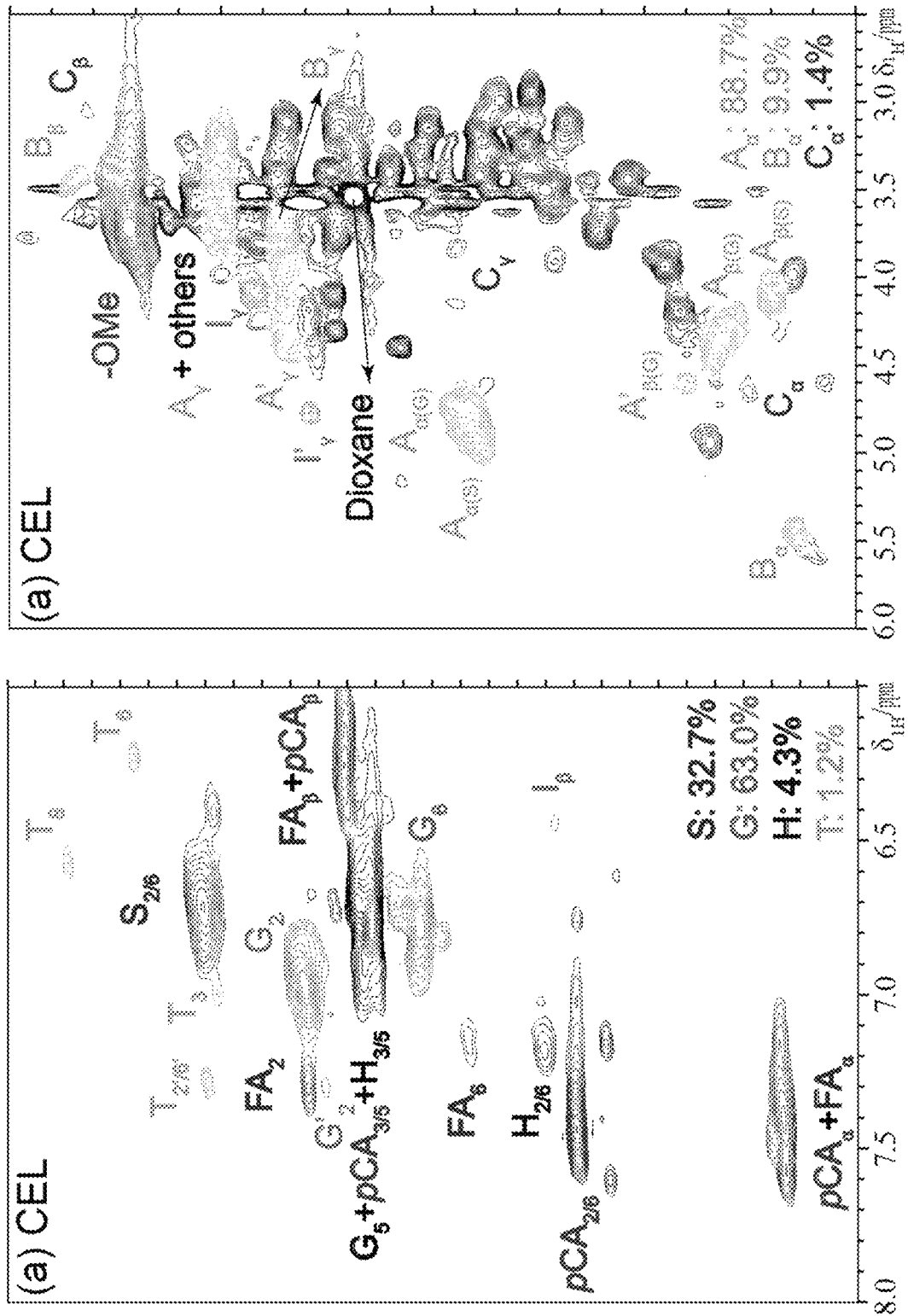
FIGS. 4a-4c show 13C-1H (HSQC) spectra of aromatic and alkyl regions.
Figure 4B:
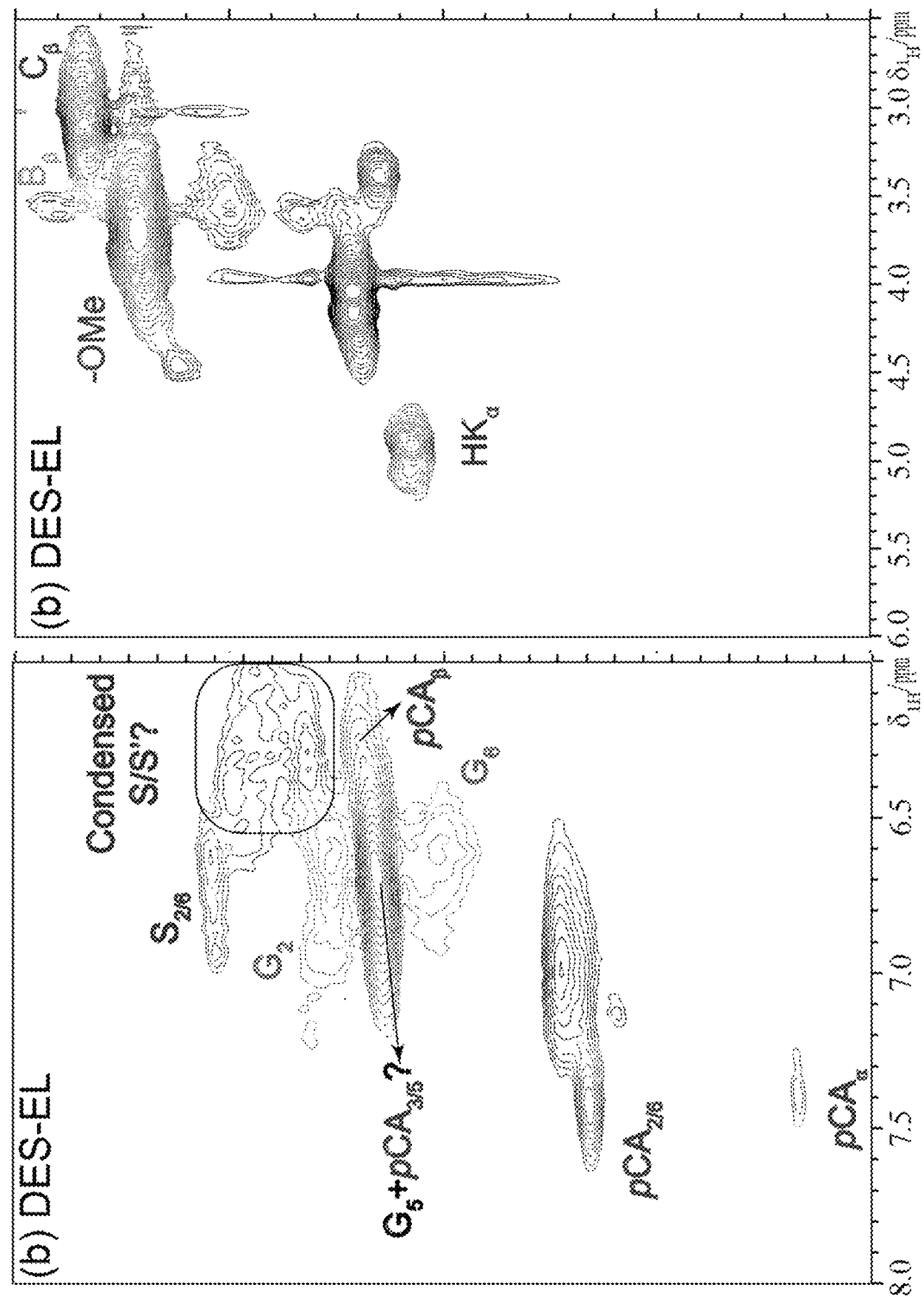
Figure 4C:
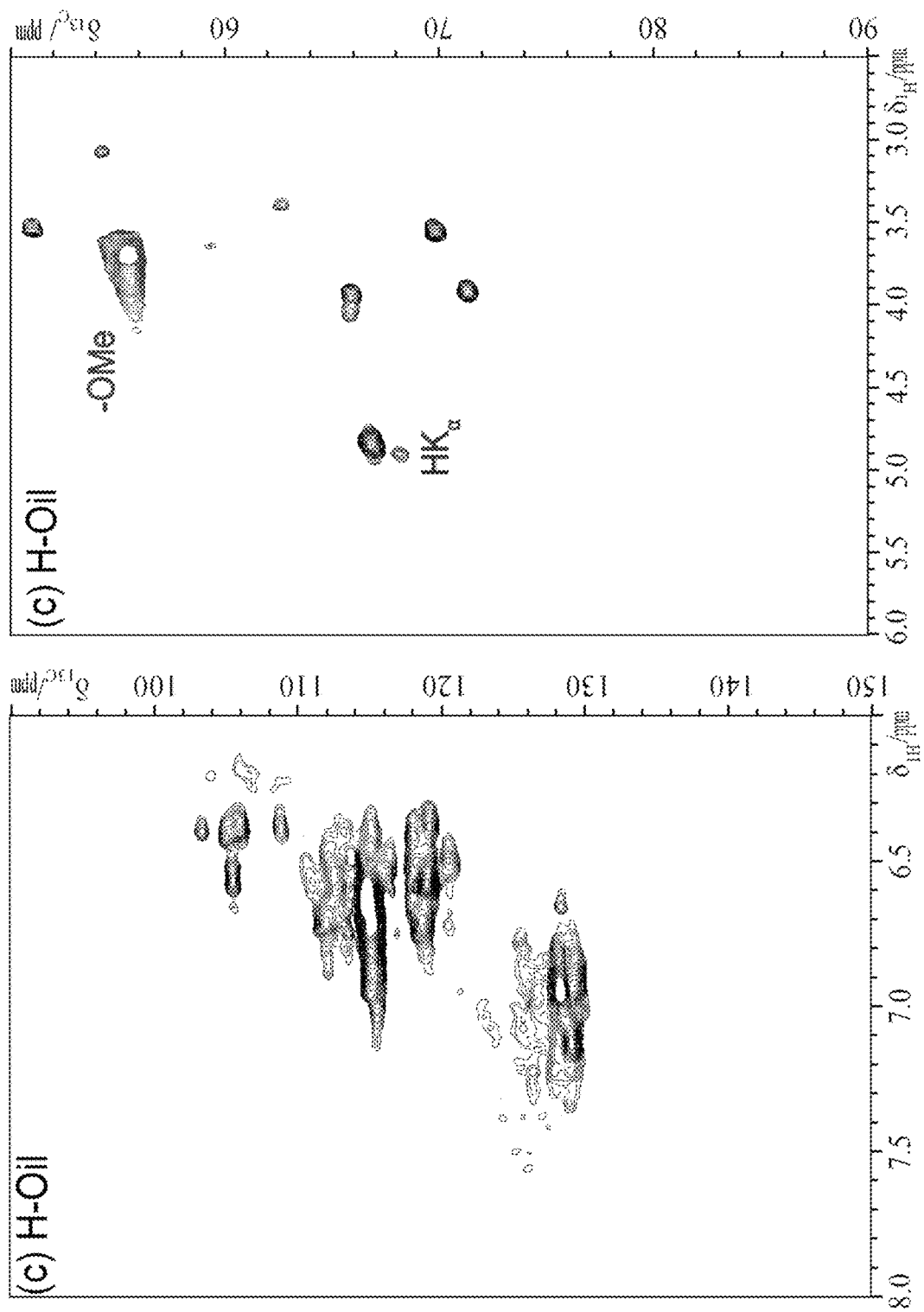

NMR Characterization of Lignin Streams 2D 13C-1H HSQC NMR was used to characterize the structural changes of lignin through DES treatment and hydrogenolysis reaction. The spectra of sorghum CEL, DES-EL, and the H-Oils are compared in terms of two regions: aromatic region between 6.0-8.0/90-150 ppm revealing lignin subunits, and aliphatic region between 2.5-6.0/50-90 ppm, which examines the nature of lignin side chain linkages (FIGS. 4a-4c). The aromatic region of CEL revealed that sorghum lignin is comprised of SGH type lignin with hydroxycinnamates (ferulate (FA), p-coumarate (pCA), and tricin (T)). On a basis of total SGH amount, the abundance of S:G:H was 33: 63%:4% and tricin of 1.2%, which is comparable with the results presented by other researchers. In addition, the sorghum lignin had 51% pCA and 7% FA in the isolated CEL.

Lignin in herbaceous plants seems to have high p-coumarate level. For example, del Rio et al. reported that p-coumarate accounts for 68% and 48% of bagasse aromatic molecules revealed from whole cell and MWL lignin HSQC spectra while Samuel R. et al. found that p-coumarate accounts for ~32% of switchgrass lignin aromatics.

After DES treatment the lignin underwent significant structural changes. For instance, the aromatic spectra of DES-EL (see FIG. 4b) showed that the tricin units completely disappeared while the signal intensity of hydroxycinnamates were significantly reduced. In addition, the contours of S and G units moved slightly down-field (2-3 ppm) in 13C axis in comparison to their chemical shifts in CEL. Previous studies suggested that transformation of these structures accompanying with chemical shifts changes are likely due to the condensed/oxidized sub-units.

After hydrogenolysis reaction, the original S, G or H subunits in CEL were almost completely transformed, which was indicated by the loss or shift of their signals in the spectra of the hydrogenolysis oil, supporting the GC-MS results of the oil composed mostly of phenolic compounds. These structural transformations may be associated with demethoxylation or interactions of other functional groups in the hydrogenolysis reaction.

Figure 4D:
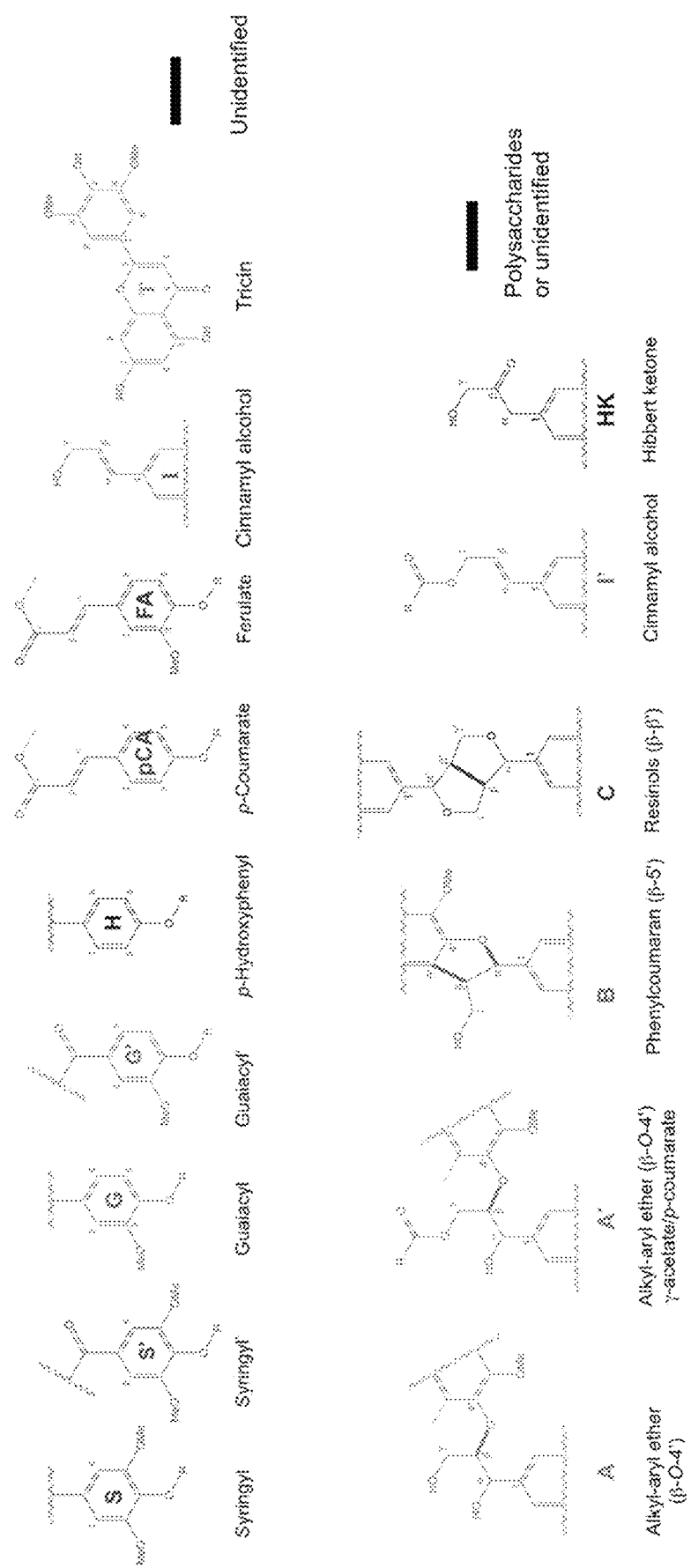
FIG. 4d shows identified compounds.
Figure 5:
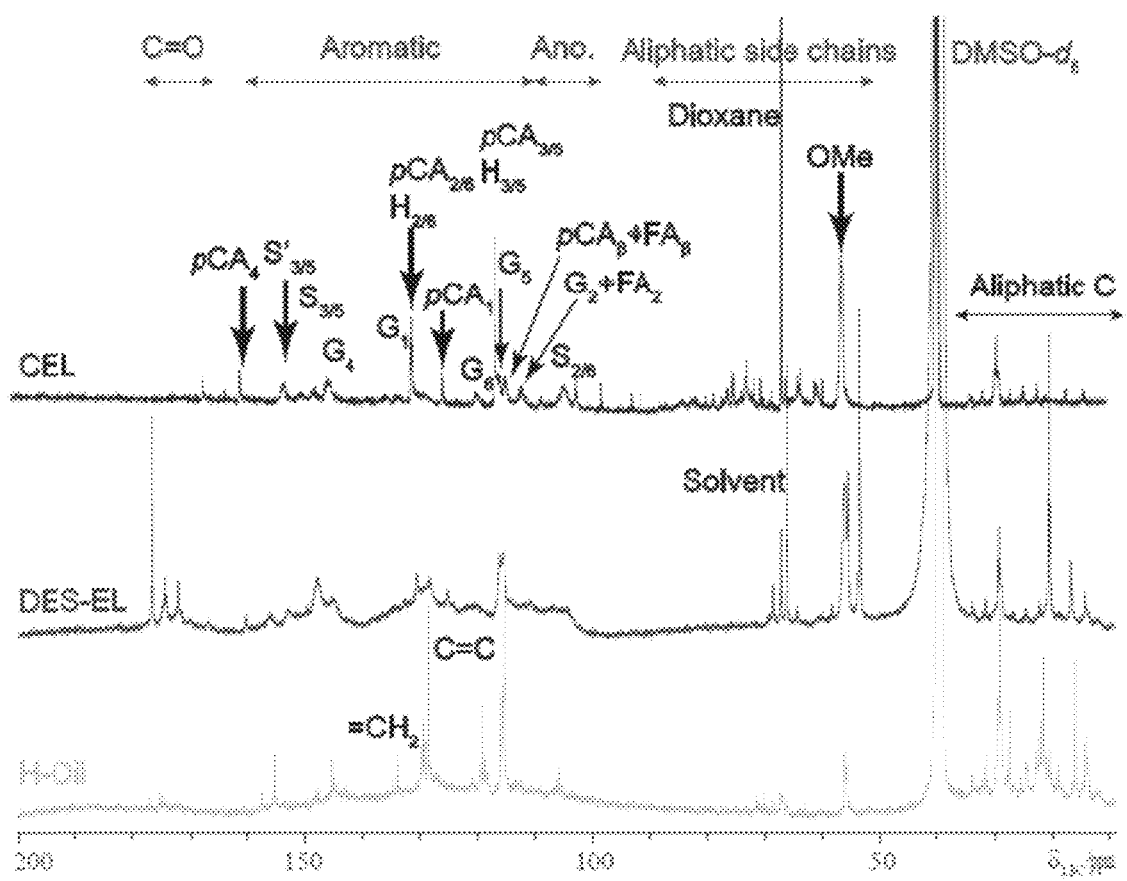
FIG. 5 shows 13C NMR spectra of CEL, DES-EL, and H-Oil from sorghum.

The HSQC spectra of the aliphatic region in FIGS. 4a-4c denoted the changes of lignin linkages among CEL, DES-EL, and H-Oil. Consistent with a previous study, sorghum lignin contains side chains β-O-4', β-5' and β-β' linkages. In case of DES-EL methoxyl groups were retained while β-O-4' aryl ether linkages were completely depleted. The HSQC spectrum of the DES-EL also illustrated that β-β' linkages were the major interunit linkages with the presence of a small amount of β-5', while the signals from their ether linkages (i.e., Cα/Hα) were not observed likely due to its cleavage during DES treatment. This is in line with the previous study on DES extracted lignin from Douglas fir. In addition, the presence of Hibbert's ketone (HK) (68.6/4.93 ppm) in DES lignin corroborates the cleavage of β-O-4' linkages by DES. The spectrum for H-Oil in FIG. 4c revealed that the major interunit linkages in lignin were not detected, and only the methoxyl groups were retained. These contours in the aromatic region appeared to be phenolic compounds after hydrogenolysis. The presence of methoxyl groups is in agreement with the identified alkylphenols via GC-MS such as 4-ethylphenol, 4-ethyl-2-methoxyphenol, and 2-methoxy-4-propylphenol (FIG. 4d). 13C NMR was also performed to provide supportive data to HSQC-NMR. The lack of prominent signals between 72-90 ppm in the DES-EL compared with CEL confirms the depletion of ether linkages (FIG. 5). In comparison to CEL, the DES-EL had a substantially increased carbonyl groups (C=O); after hydrogenolysis, these C=O signals in DES-EL were decreased significantly in hydrogenolysis products. This suggested that lignin has been oxidized through DES treatment and the resulting carboxylate groups were readily subject to hydrogenolysis in the following catalytic reaction, in accordance with previous literature, which shows that Ru greatly improved the rate of hydrogenation of carbonyl groups. The 13C spectra also showed that the major lignin structural units were retained in the DES-EL, but were not detected in the oil due to hydrogenolysis of these macromolecules to phenolic monomers, suggesting a substantial depolymerization of DES-EL through catalytic hydrogenolysis. In addition, aromatic signals from phenolic compounds at 105-145 ppm along with a high level of saturated aliphatic peaks at 15-40 ppm were observed in the 13C spectrum of H-Oil sample, which is in agreement with the previous HSQC results.

Figure 6:
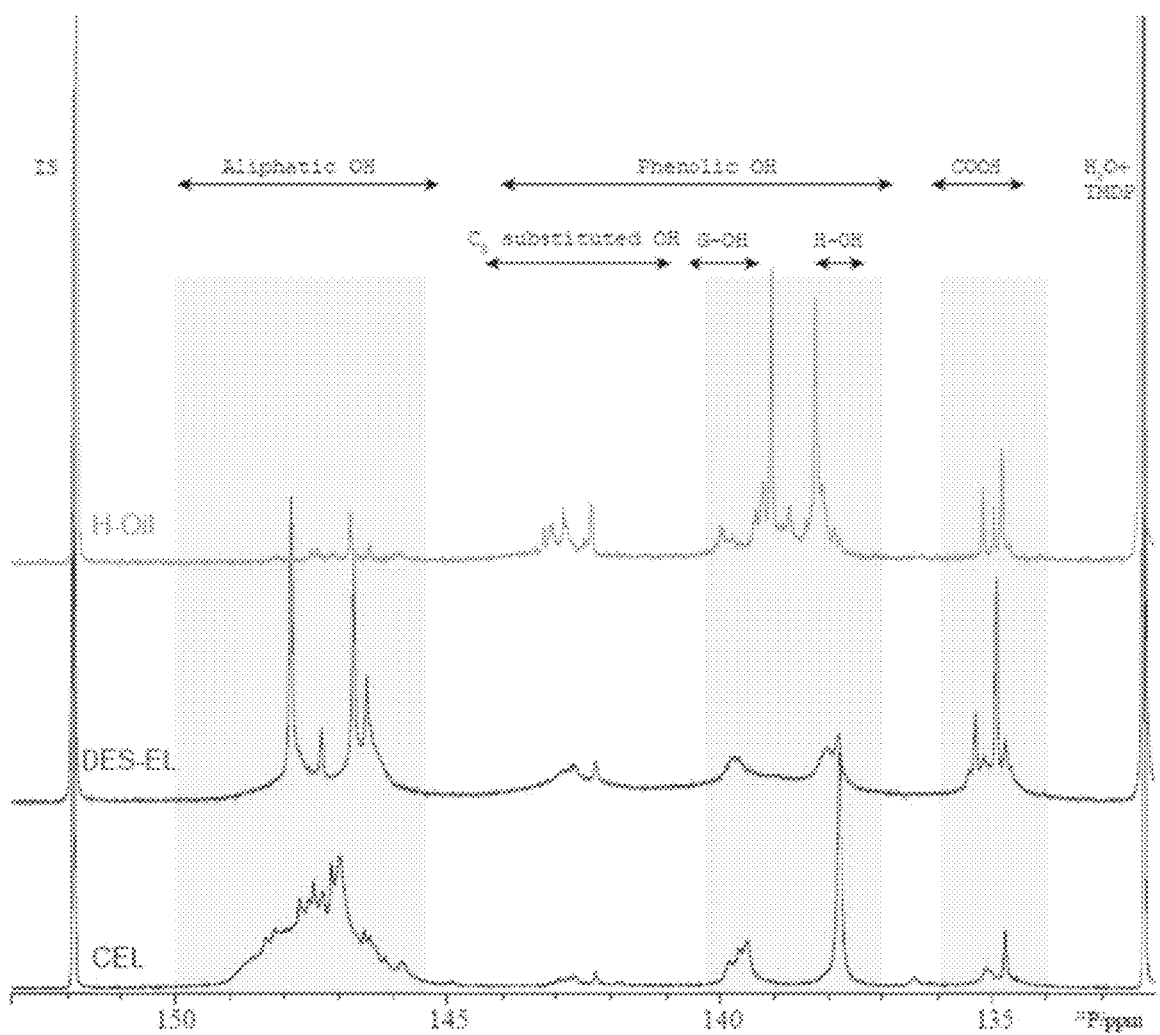
FIG. 6 shows 31P NMR spectra of sorghum CEL, DES-EL, and H-Oil after phosphitylation.

To further examine the structural characteristics of sorghum CEL, DES-EL, and H-Oil, 31P NMR was conducted on phosphitylated samples to investigate the change of hydroxyl groups in these samples (FIG. 6 and Figure S2). The results demonstrated that hydroxyl groups underwent a significant change during DES treatment and hydrogenolysis reaction. For example, the aliphatic OHs decreased remarkably from CEL to DES-EL. The aliphatic OHs further decreased significantly in H-Oils, which indicates there is negligible side chain hydroxyl groups left in the hydrogenolysis products, which could be a result of lignin degradation or cleavage of side chains in this reaction. This is in line with the 13C spectra showing that an increase of alkylated compounds in the H-Oils after catalytic hydrogenolysis. In addition, the phenolic OHs (Ar—OH) increased strikingly in hydrogenolysis oil compared with DES-EL indicating a break-down of lignin into alkylphenolic products in hydrogenolysis oil, in support of previous GC-MS results. These results together suggest that DES treatment depolymerized sorghum lignin by cleaving the ether bonds and oxidized some lignin into carboxylate groups; the Ru/C catalyst facilitated the hydrogenolysis reaction forming ketone groups as well as a breakdown to alkylphenolic compounds.

CONCLUSIONS

Deep eutectic solvent was used to extract lignin from sorghum and subsequently catalytic transfer hydrogenolysis (CTH) was performed on the extracted lignin using platinum group noble metals for production of lower molecular weight phenolic compounds. Among tested catalysts, Ru/C proved to be most effective as compared to Pd/C and Pt/C in presence of isopropyl alcohol. Results illustrate that temperature, catalyst loading, and reaction time played roles in the depolymerization of DES-EL during CTH. The highest lignin oil yield (36.3 wt %) was achieved under a reaction condition at 270° C., reaction time of 60 min, and Ru/C catalyst loading of 15%, with the main lignin degradation products identified as phenol, 4-ethylphenol, 4-ethyl-2-methoxyphenol, 2-methoxy-4-propylphenol, and 4-hydroxy-benzenepropanoic acid.

Molecular weights of the solid residues and the hydrogenolysis oils were lower than the unreacted DES-EL, demonstrating depolymerization of DES-EL to lower molecular weight products. NMR analysis of the DES-EL revealed a significant structural alteration such as a considerable cleavage of the side chain alkyl-aryl ether linkages of sorghum lignin, while retaining methoxyl groups in the hydrogenolysis oil. The hydrogenolysis oil has shown a further transformed structure consisting of alkylated products, which indicates the break-down of lignin into phenolics and alkylated compounds. The results from this study provide a deep understanding of the DES-EL and the hydrogenolysis of DES-EL to valuable products that can be potentially upgraded to the fuel molecules and platform chemicals.

REFERENCES (1) Ragauskas et al. Science 2014, 344 (6185), DOI 10.1126/science.1246843.
(2) Zakzeski, et al. Chem. Rev. 2010, 110 (6), DOI 10.1021/cr900354u.
(3) Beckham et al. Curr. Opin. Biotechnol. 2016, 42, 40-53, DOI 10.1016/j.copbio.
(4) Behling et al. Green Chem. 2016, 18 (7), 1839-1854, DOI 10.1039/C5GC03061G.
(5) Abbott et al. J. Am. Chem. Soc. 2004, 126 (29), 9142-9147, DOI 10.1021/ja048266j.
(6) Francisco et al. Green Chem. 2012, 14 (8), 2153-2157, DOI 10.1039/C2GC35660K.
(7) Alvarez-Vasco et al. Green Chem. 2016, 18 (19), 5133-5141, DOI 10.1039/C6GC01007E.
(8) Xu et al. Bioresour. Technol. 2016, 203, 364-369, DOI 10.1016/j.biortech.
(9) Zhang et al. Chem. Soc. Rev. 2012, 41 (21), DOI 10.1039/C2CS35178A.
(10) Kim et al. Green Chem. 2018 DOI 10.1039/C2CS35178A.
(11) Kumar et al. Environ. Sci. Pollut. Res. 2016, 23 (10), 9265-9275, DOI 10.1007/s1135.
(12) Tian et al. Biotechnol. Biofuels 2017, 10 (1), 157, DOI 10.1186/s13068.
(13) Li et al. Int. J. Mol. Sci. 2017, 18 (11), 2266, DOI 10.3390/ijms18112266.
(14) Regmi et al. Catal. Today 2017, DOI 10.1016/j.cattod.
(15) Molinari et al. ACS Cat. 2016, 6 (3), 1663-1670, DOI 10.1021/acscatal.0 5b01926.
(16) Galkin et al. ChemSusChem 2014, 7 (8), 2154-2158, DOI 10.1002/cssc.201042017.
(17) Xu et al. Chem. Soc. Rev. 2014, 43 (22), 7485-7500, DOI 10.1039/C4CS00235K.
(18) Zhang et al. Green Chem. 2014, 16 (5), 2432-2437, DOI 10.1039/C3GC42589D.
(19) Barta et al. Green Chem. 2010, 12 (9), 1640-1647, DOI 10.1039/C0GC00181C.
(20) Kim et al. Green Chem. 2017, 19 (1), 215-224, DOI 10.1039/C6GC02473D.
(21) Li et al. Chem Rev 2015, 115 (21), 11559-624, DOI: 10.1021/acs.chemrev.5b00155.
(22) Kim et al. Energy Fuels 2015, 29 (8), 5154-5163, DOI 10.1021/acs.energyfuels.5b01055.
(23) Kristianto et al. Bioresour. Technol. 2017, 234, 424-431, DOI 10.1016/j.biortech.
(24) Shu et al. Chem. Eng. J. 2018, DOI 10.1016/j.cej.2018.01.002.
(25) Wu et al. Bioresour. Technol. 2011, 102 (7), 4793-4799, DOI 10.1016/j.biortech.2011.01.023.
(26) Bennett et al. Bioresour. Technol. 2009, 100 (4), 1595-1607, DOI 10.1016/j.biortech.2008.09.023.
(27) Das et al. Bioresour. Technol. 2017, 244, 641-649, DOI 10.1016/j.biortech.2017.08.008.
(28) Hatfield et al. Front. Plant Sci. 2017, 7, 2056, DOI 10.3389/fpls.2016.02056.
(29) Luo et al. ACS Sus. Chem. Eng. 2016, 4 (4), 2316-2322, DOI 10.1021/acssuschemeng.5 b01776.

(30) Samuel et al. Front. Energy Res. 2014, 1, 1-9, DOI 10.3389/fenrg.2013.00014.
(31) Yoo et al. ChemSusChem 2016, 9 (10), 1090-1095, DOI 10.1002/cssc.201600135.
(32) Hu et al. Holzforschung 2006, 60 (4), 389-397, DOI 10.1515/HF.2006.061.
(33) Sun et al. J. Agric. Food. Chem. 2014, 62 (32), 8120-8128, DOI 10.1021/jf501669r.
(34) Li et al. ChemistrySelect 2017, 2 (12), 3557-3561, DOI 10.1002/slct.201700735.
(35) Sluiter et al. Laboratory analytical procedure 2008, 1617.
(36) Barta et al. Green Chem. 2014, 16 (1), 191-196, DOI 10.1039/C3GC41184B.
(37) Wu et al. Dalton Trans. 2012, 41 (36), 11093-11106, DOI 10.1039/C2DT31065A.
(38) Sergeev et al. Science 2011, 332 (6028), 439-443, DOI 10.1126/science.1200437.
(39) Rensel et al. J. Catal. 2013, 305, 256-263, DOI 10.1016/j.jcat.2013.05.026.
(40) He et al. J. Am. Chem. Soc. 2012, 134 (51), 20768-20775, DOI 10.1021/ja309915e.
(41) Kim et al. Catal. Commun. 2016, 86, 113-118, DOI 10.1016/j.catcom.2016.08.022.
(42) Panagiotopoulou et al. Appl. Cat. A. 2014, 480, 17-24, DOI 10.1016/j.apcata.2014.04.018.
(43) Gosselink et al. Bioresour. Technol. 2012, 106, 173-177, DOI 10.1016/j.biortech.2011.11.121.
(44) Long et al. Bioresour. Technol. 2014, 154, 10-17, DOI 10.1016/j.biortech.2013.12.020.
(45) Kristianto et al. Bioresour. Technol. 2017, DOI 10.1016/j.biortech.2017.03.070.
(46) Johnstone et al. Chem. Rev. 1985, 85 (2), 129-170, DOI 10.1021/cr00066a003.
(47) Li et al. Chem. Rev 2015, 115 (21), 11559-11624, DOI 10.1021/acs.chemrev.5b00155.
(48) Fang et al. Bioresour. Technol. 2008, 99 (9), 3424-3430, DOI 10.1016/j.biortech.2007.08.008.
(49) Wang et al. J. Phy. Chem. C 2008, 112 (32), 12486-12494, DOI 10.1021/jp803093w.
(50) Li et al. Fuel Process. Technol. 2009, 90 (5), 657-663, DOI 10.1016/j.fuproc.2008.12.003.
(51) Mubarak et al. Algal Res. 2015, 7, 117-123, DOI 10.1016/j.algal.2014.10.008.
(52) Kim et al. Energy Fuels 2014, 28 (10), 6429-6437, DOI 10.1021/ef501678w.
(53) Kloekhorst et al. Biomass Bioenergy 2015, 80, 147-161, DOI 10.1016/j.biombioe.2015.04.039.
(54) Huang et al. Bioresour. Technol. 2014, 171, 95-102, DOI 10.1016/j.biortech.2014.08.045.
(55) Saisu et al. Energy Fuels 2003, 17 (4), 922-928, DOI 10.1021/ef0202844.
(56) Saidi et al. Energy Environ. Sci. 2014, 7 (1), 103-129, DOI 10.1039/C3EE43081B.
(57) Kim et al. Chemosphere 2013, 93 (9), 1755-1764, DOI 10.1016/j.chemosphere.2013.06.003.
(58) Tejado et al. Bioresour. Technol. 2007, 98 (8), 1655-1663, DOI 10.1016/j.biortech.2006.05.042.
(59) Cachet et al. Ind. Crops Prod. 2014, 58, 287-297, DOI 10.1016/j.indcrop.2014.03.039.
(60) Prado et al. Green Chem. 2016, 18 (3), 834-841, DOI 10.1039/C5GC01950H.
(61) El Hage et al. Polym. Degrad. Stab. 2009, 94 (10), 1632-1638, DOI 10.1016/j.polymdegradstab.2009.07.007.
(62) Gordobil et al. Ind. Crops Prod. 2016, 83, 155-165, DOI 10.1016/j.indcrop.2015.12.048.
(63) Li et al. Green Chem. 2016, 18 (6), 1439-1454, DOI: 10.1039/C5GC03062E.
(64) Eudes et al. PloS one 2017, 12 (6), DOI 10.1371/journal.pone.0178160.
(65) del Rio et al. Biomass Bioenergy 2015, 81, 322-338, DOI 10.1016/j.biombioe.2015.07.006.
(66) Wen et al. J. Agric. Food. Chem. 2013, 61 (3), 635-645, DOI 10.1021/jf3051939.
(67) Chen et al. Green Chem. 2016, 18 (1), 271-281, DOI 10.1039/C5GC02286J.
(68) Sun et al. J. Agric. Food. Chem. 2013, 61 (18), 4226-4235, DOI 10.1021/jf400824p.
(69) Lee et al. Applied Catalysis B: Environmental 2013, 140, 98-107, DOI 10.1016/j.apcatb.2013.03.031.
(70) Olcay et al. Green Chem. 2014, 16 (2), 911-924, DOI 10.1039/C4GC00011K Mechanisms of Ionic Liquid Inhibition of *Trametes versicolor* Laccase Methods and Materials Materials

*Trametes versicolor* laccase (0.66 U/mg), 2,2'-azino-bis (3-ethylbenzothiazoline-6-sulphonic acid) (ABTS), alkaline (Kraft) lignin, choline hydroxide, L-lysine, and the IL [$C_2C_1$Im][OAc] were purchased from Sigma Aldrich (St. Louis, Mo., USA). Diethylamine (DEA), sulfuric acid (H2SO4), guaiacylglycerol-β-guaiacyl ether (GGE), tetrahydrofuran (THF, 99%), 2-methyltetrahydrofuran (MeTHF, 99%), and ethyl acetate (99%) were purchased from Tokyo Chemical Industry Co. (Portland, Oreg., USA).

Ionic Liquid Synthesis

[DEA][$HSO_4$] was synthesized according to the previously developed protocol (George, Brandt et al. 2015). Briefly, DEA was diluted in $H_2O$ (1 mL DEA/mL $H_2O$) and placed in an ice bath. Dilute $H_2SO_4$ (1 mL $H_2SO_4$/3 mL $H_2O$) was added dropwise under constant stirring. The mixture was allowed to mix for an additional 3 hours. Water was removed from the final mixture by storing the mixture in a vacuum evaporator at room temperature for several days.

Biocompatibility Screening

All solutions used were adjusted to pH 5.0 prior to beginning experiments. Appropriate concentrations of laccase and AILs were mixed and added to clear, flat bottom 96-well Costar Assay Plates (Corning Inc.; Kenneburk, Me.). ABTS was added for a final concentration of 2 mM. Sodium citrate buffer (1.0 M, pH 5.0) was added for a final well volume of 250 µL. ABTS oxidation was measured for 5 minutes at 40° C. Absorbance readings were taken every 30 seconds at a wavelength of 420 nm using a SpectraMax M2 plate reader from Molecular Devices (Sunnyvale, Calif., USA). Plates were shaken for 5 seconds prior to initial reading and 3 seconds before each reading to ensure homogeneous well solutions.

AIL Inhibition

Michaelis-Menten and Lineweaver-Burke Curves

Michaelis-Menten curves were generated by mixing appropriate concentrations of AILs and ABTS with 0.30 µg laccase in 96-well plates. Sodium citrate buffer (1.0 M, pH 5.0) was added for a final well volume of 250 µL. ABTS oxidation was measured using the same method as the initial screening. Laccase activity (V) was measured as moles of ABTS oxidized per minute per gram of laccase (mol ABTS·$min^{-1}$·$g^{-1}$ lac.) and $K_m$ was measured in µmol ABTS. Activity was fit to the Michaelis-Menten curve, shown in equation 1.

$$V = \frac{V_{max} \times [S]}{K_m + [S]} \quad (1)$$

These curves were linearized using the Lineweaver-Burke method, resulting in equation 2.

$$\frac{1}{V} = \frac{K_m}{V_{max}} \times \frac{1}{[S]} + \frac{1}{V_{max}} \quad (2)$$

Equation 2 was used to solve for $K_m$ and $V_{max}$ of laccase in known concentrations of AILs.

Docking Simulations

Docking simulations were performed with Yasara (Yasara Biosciences GmbH, Vienna, Austria) and AutoDock Vina (Trott and Olson 2010). The cations and anions were treated as separate ligands, with 25 simulations run for each ligand. At the beginning of each simulation, the ligand was placed at a random starting location. The side chains of laccase residues were kept rigid throughout all simulations. Results of the docking simulations were visualized with PyMol software (Schrodinger LLC, New York, N.Y.).

Lignin Model Compound Depolymerization

Appropriate concentrations of AIL, ABTS, laccase, and GGE were mixed. Sodium citrate buffer (1.0 M, pH 5.0) was added for a final reaction volume of 1 mL. Reactions were carried out in a batch reactor at 40° C. Pure $O_2$ was flowed through the reactor for 1 minute. The release valve of the reactor was closed, pure $O_2$ was flowed in at a pressure of 30 psi, and the reaction was allowed to proceed for an additional 2 hours.

Product profiles were analyzed by HPLC using the method as described previously (Deng, Zhang et al. 2015). Water and acetonitrile (8:2 v/v) was used as a mobile phase. Mobile phase was flowed at 0.5 mL $min^{-1}$ for 30 minutes through an Ultimate 3000 HPLC system (Dionex Corporation, Sunnyvale, Calif., USA) equipped with ultraviolet (UV) detector. Separation was achieved through use of a Zorbax Eclipse XDB-C18 column (5 µm particle size, 150×4.6 mm i.d., Agilent Technologies, Santa Clara, Calif., USA) at 25° C. Elution profile of column was measured by UV absorbance at 280 nm.

Lignin Biocatalysis, Extraction, and Analysis

Appropriate concentrations of AIL, ABTS, laccase, and Kraft lignin were mixed in a batch reactor. Sodium citrate buffer (1.0 M, pH 5.0) was added for a final volume of 10 mL. Pure $O_2$ was flowed through the reactor for 1 minute, at which point the release valve of the reactor was closed. Pure $O_2$ was flowed into the reactor at 30 psi and the reaction was allowed to proceed for 3 hours.

After the reaction, residual lignin was precipitated by addition of 20 mL water and centrifugation at 7,000 rpm for 15 minutes. The liquid fraction was subjected to liquid-liquid extraction with ethyl acetate 3 times. The ethyl acetate was evaporated to leave a thick oil in a vacuum oven set at room temperature for 24 h. The oil was dissolved in 750 µL MeTHF and analyzed by GC/MS for lignin decomposition products. Oil yield was calculated using equation 3.

$$\text{Oil Yield}(\%) = \frac{\text{weight of oil}}{\text{initial lignin} - \text{solid fraction after reaction}} \times 100 \quad (1)$$

The precipitated solids (residual lignin) were washed with 50 mL water three times to remove any excess IL and dried in an oven at 45° C. for 48 h. Lignin conversion was calculated using equation 4.

$$\text{Conversion}(\%) = \frac{\text{weight of initial lignin} - \text{weight of remaining lignin}}{\text{weight of initial lignin}} \times 100 \quad (2)$$

Identification and quantification of the monomeric products from the depolymerization reaction were performed by Agilent 7890B GC coupled 5977B MS with an HP-5 ms (60 m×0.32 mm) capillary column. The temperature program started at 50° C. and increased to 120° C. at 10° C. $min^{-1}$ with a holding time of 5 min; then it was raised to 280° C. at 10° C. $min^{-1}$ with a holding time of 8 min and to 300° C. at 10° C. $min^{-1}$ with holding time of 2 min (Prado, Brandt et al. 2016). Helium was used as a carrier gas at a flow rate of 1.2 mL $min^{-1}$. Calibration curves were created using commercially available pure compounds: guaiacol, syringol, vanillin, acetovanillone, and homovanillic acid (Sigma Aldrich, St. Louis, Mo., USA).

Lignin Characterization

Gel Permeation Chromatography (GPC)

The weight-average molecular weight ($M_w$) and number-average molecular weight ($M_n$) of both precipitated lignin and lignin in the liquid phase following reactions were determined by GPC. After separation of solids, 10 µL of liquid was dissolved in 500 µL THF. The solid fraction was prepared for GPC via acetobromination (Guerra, Lucia Lucian et al. 2008).

The mixtures were analyzed with the HPLC system equipped with a Mixed-D PLgel column (5 µm particle size, 300×7.5 mm i.d., molecular weight range of 200-400,000 µm, Polymer Laboratories, Amherst, Mass., USA) at 50° C. THF was flowed at 0.5 mL $min^{-1}$ for 30 minutes. Elution profile of column was measured by UV absorbance at 300 nm and calibrated using a polystyrene standards kit (Sigma-Aldrich).

Fourier Transform Infrared Spectroscopy (FTIR)

Chemical structures of alkaline lignin and treated lignin were determined using a Thermo Nicolet 870 FTIR-ATR spectrometer. Lignin sample spectra were obtained with 64 scans at wavelengths from 700 to 4000 $cm^{-1}$ with a spectral resolution of 1.928 $cm^1$.

Differential Scanning Calorimetry (DSC)

DSC measurements of alkaline and treated lignin samples were performed using a DSC Q20 (TA Instruments) equipped with an autosampler. Analysis was carried out in a temperature range of 40-500° C. at a rate of 10° C./min and nitrogen flow of 50 mL/min.

HSQC NMR of Lignin

The lignins were collected directly into NMR tubes (ca. 100 mg for each sample) along with ca. 1 mg $Cr(acac)_3$. The mixture was then dissolved using DMSO-$d_6$/pyridine-ds (4:1) using mild heat and sonication until a homogeneous mixture was obtained. NMR spectra were acquired on a JEOL (Peabody, Mass.) ECZr 500 MHz spectrometer equipped with a 5-mm Royal Probe. The central DMSO solvent peak was used as an internal reference ($\delta_C$ 39.5, $\delta_H$ 2.5 ppm). The $^1H$-$^{13}C$ correlation experiment was an HSQC experiment (JEOL standard pulse sequence 'hsqc_dec-club_pn'). HSQC experiments were carried out using the following parameters: acquired from 12 to 0 ppm in F2 ($^1H$) with 1024 data points (acquisition time 136 ms), 220 to 0 ppm in F1 ($^{13}C$) with 256 increments (F1 acquisition time 9.24 ms) of 150 scans with a 1 s interscan delay. In all cases, processing used typical sine bell (90°) in F2 and squared sine-bell (90°) in F1. Volume integration of contours in HSQC plots used Maetrelabs MestReNova 12.0 (Mac version) software. Integrals were from volume-integration of C/H pairs with similar properties, the α-C/H correlations of A, B, and C units. Spectra are displayed in absolute value mode and color coded (in Adobe Illustrator CC 2018) using authentic or literature reference standards.

Results and Discussion

Biocompatibility Screening

Figure 7:
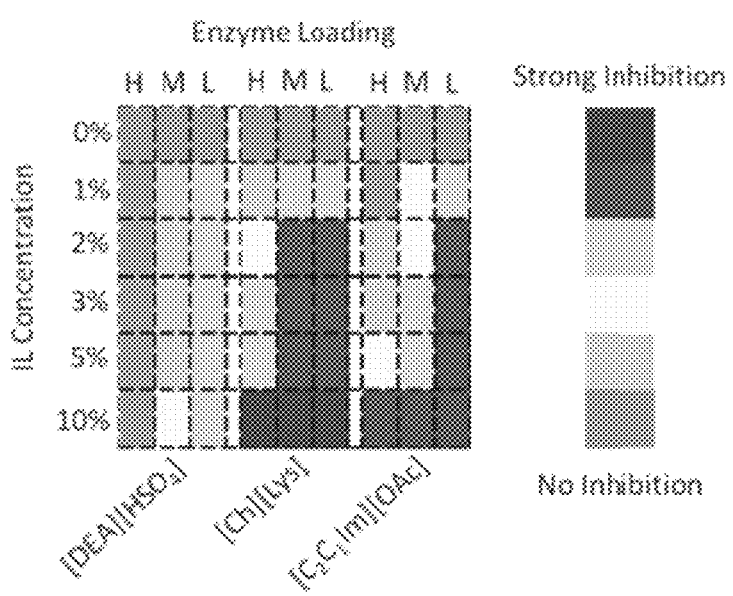
FIG. 7 shows a heatmap showing the biocompatibility of AILs with $T.\ versicolor$ laccase.

The three AILs were screened for their biocompatibility with *T. versicolor* laccase. FIG. 7 represents the activity trends of laccase in AILs. [DEA][HSO$_4$] was the most biocompatible of the three AILs screened, with laccase losing little of its activity in 10% [DEA][HSO$_4$]. Alternatively, laccase lost >50% of its activity in just 2% [Ch][Lys]. This trend indicates that the acidity and alkalinity of the AILs determines their biocompatibility. [DEA][HSO$_4$] is acidic due to the [HSO$_4$] ion, whereas [Ch][Lys] is alkaline due to the [Lys]$^-$ ion. Fungal laccases favor acidic environments, therefore the acidic nature of [DEA][HSO$_4$] was more biocompatible with laccase activity than the alkaline nature of [Ch][Lys]. Previous studies have also shown that ILs with sulfate anions are more biocompatible with laccases (Rehmann, Ivanova et al. 2012, Fernández-Fernández M 2014). The contrast in biocompatibility between the 3 AILs is striking, such that we sought to determine their mechanisms of inhibition.

Inhibition Mechanisms in AILs

Figure 8A:
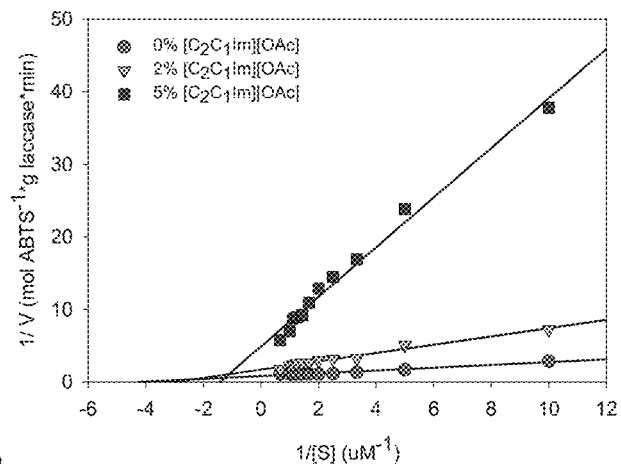
FIGS. 8a-8c show Lineweaver-Burke curves of laccase.
Figure 8B:
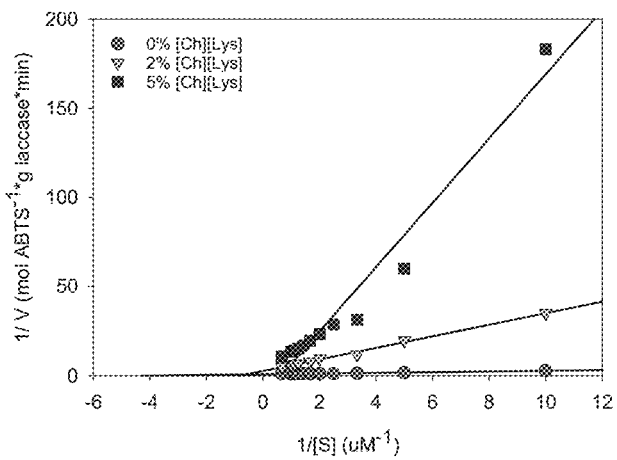
Figure 8C:
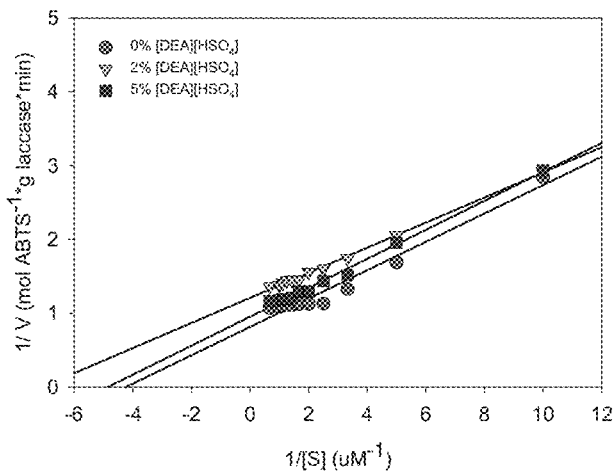

The Lineweaver-Burke curves in FIGS. 8a-8c indicate that [C$_2$C$_1$Im][OAc] and [Ch][Lys] use the same type of inhibition, whereas [DEA][HSO$_4$] uses a method different from the other two ILs. The changes in V$_{max}$ and K$_m$ with respect to AIL concentration revealed [C$_2$C$_1$Im][OAc] and [Ch][Lys] use mixed inhibition; while not directly competing with the substrate for the active site, these two AILs affect the residues surrounding the active site. Alternatively, [DEA][HSO$_4$] uses noncompetitive inhibition; this IL allows the substrate to bind the active site, favoring binding to the enzyme-substrate ([E][S]) complex. To confirm if the mechanisms proposed are accurate, docking simulations were used to provide additional evidence.

Docking Simulations

Figures 9A, 9B, 9C, 9D:
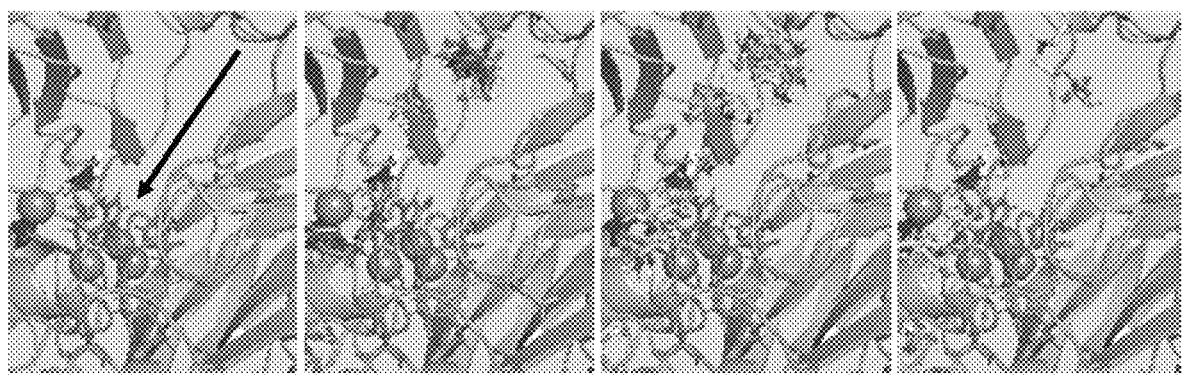
FIGS. 9a-9d show disruption of channel leading to the active site of $T.\ versicolor$ laccase. The channel is indicated by the arrow in FIG. 9a. Coppers are represented as spheres and the coordinating His residues.

When the docking simulations were modeled in PyMol, the results were remarkably consistent with the inhibition mechanisms proposed based on the Lineweaker-Burke curves. FIG. 9a is a model of the channel in free laccase leading to the active site containing the copper cluster. FIGS. 9b and 9c indicate that [C$_2$C$_1$Im][OAc] and [Ch][Lys] had a high probability of binding to a site near this channel. FIG. 9d indicates that [DEA][HSO4] does not bind, with any significant probability, residues in the channel. Enzyme kinetics and molecular simulations with alkylimidazolium ILs and laccases have found that cations of varying chain length interacted with the active site via hydrophobic interactions (Sun, Liu et al. 2017). The shorter chain length cations (C$_2$-C$_6$) were capable of diffusing into the active site; longer chain length cations (C$_8$-C$_{10}$) were limited to binding to Leu residues around the active site entrance. To our knowledge, there has not been any work done to highlight the inhibitory mechanisms used by [Ch][Lys] or [DEA][HSO4]. We sought to determine if the effects of AILs on laccase extended into a system with a lignin model compound.

Model Compound Experiments

Laccase in 10% [DEA][HSO$_4$] was capable of degrading GGE, whereas laccase in 2% [C$_2$C$_1$Im][OAc] or 1% [Ch][Lys] was not capable of breaking down GGE (FIG. 9a). Upon addition of the mediator ABTS to the reaction system, laccase in 2% [C$_2$C$_1$Im][OAc] or 1% [Ch][Lys] was able to break down GGE (FIG. 9b). Again, it is observed that [C$_2$C$_1$Im][OAc] and [Ch][Lys] affect the catalytic properties of laccase differently than [DEA][HSO4]. Some studies have found that acidic ILs are capable of cleaving the β-O-4' linkage on their own (Jia, Cox et al. 2010) (Cox et al.). The cleavage of the β-O-4' linkage could be attributed to both the laccase and the acidity of [DEA][HSO4]. The selective degradation of a β-O-4' model compound with laccase and AILs is promising for directing product formation from lignin degradation.

Kraft Lignin Experiments

Mass Balance

Weighing precipitated solids after all treatments revealed treatment with 10% [DEA][HSO$_4$] resulted in the highest conversion, 21.7% of solids. When weighing the extracted oil after treatment, 1% [Ch][Lys] resulted in the highest yield of oil, 6.4 mg. Although 10% [DEA][HSO$_4$] resulted in the highest level of conversion, 1% [Ch][Lys] resulted in the highest yield of products. It is possible that the high concentration of [DEA][HSO4], its observed biocompatibility, and its ability to degrade β-O-4' lignin model compounds, the solubilized fraction was oxidized into products that can't be detected.

Figure 10A:
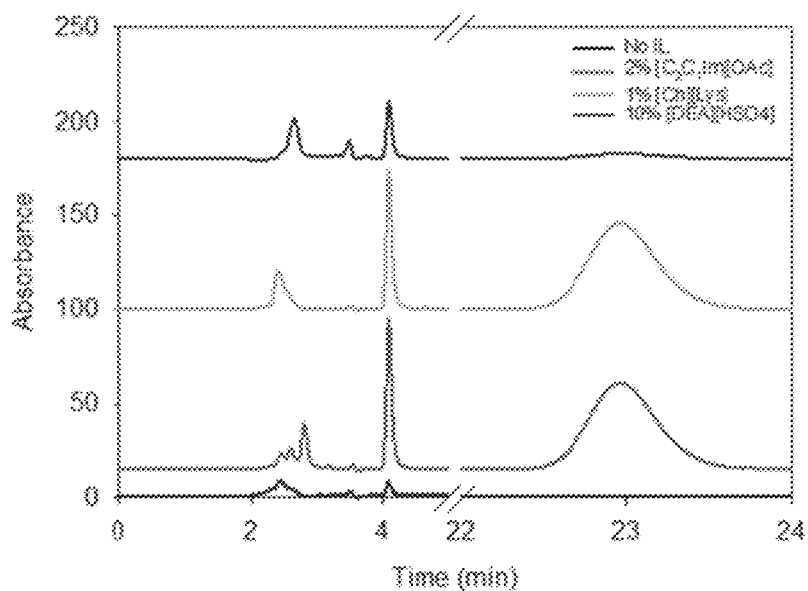
FIGS. 10a-10b show HPLC chromatograms of GGE with laccase and AILs.
Figure 10B:
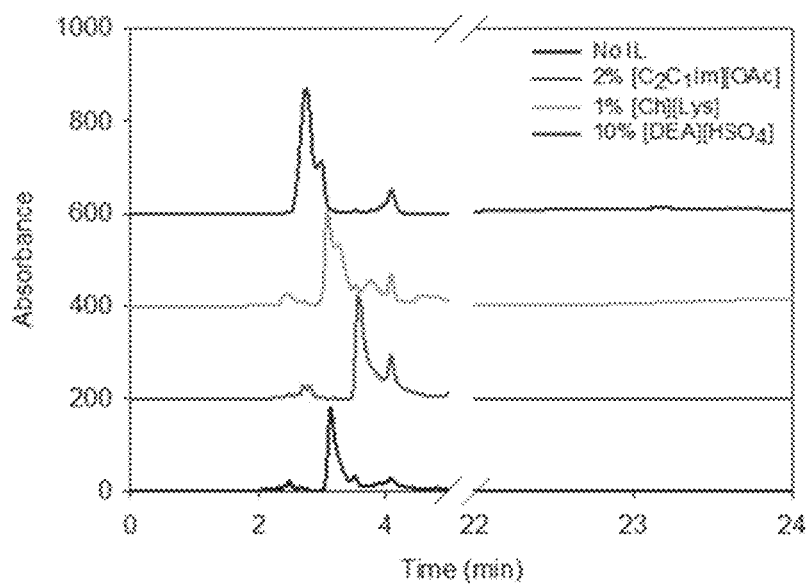
Figure 11:
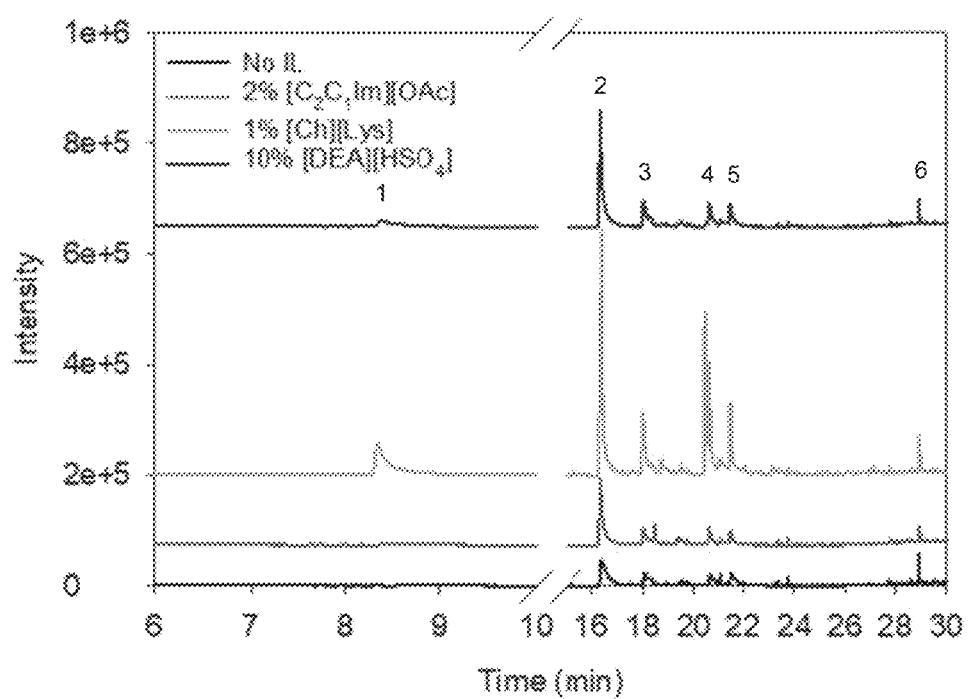
FIG. 11 shows GC/MS chromatograms of Kraft lignin breakdown products after treatment with laccase, AILs, and ABTS. Major products identified were 1) guaiacol, 2) vanillin, 3) acetovanillone, 4) homovanillic acid, 5) syringaldehyde, and 6) acetosyringone.

Analysis of extracted products with GC/MS revealed vanillin to be the primary degradation product, followed by homovanillic acid, syringaldehyde, acetovanillone, and guaiacol (FIG. 10b). Products obtained from lignin degradation were the same for all 3 AILs, indicating the selective degradation observed with the model dimer does not extend to real lignin. This is not surprising given the structural heterogeneity of real lignin relative to a model dimer.

Fourier Transform Infrared Spectroscopy

Analysis of FTIR spectra indicate minimal differences between alkaline and treated lignin samples. The only difference can be seen in the peak at 1,110 cm$^{-1}$; this peak corresponds to the aromatic C—H plane deformation in S-lignin. The peaks at 1,110 cm$^{-1}$ for treated lignin samples are reduced when compared to untreated alkaline lignin. This is not surprising given that most of the products obtained were derivatives of S-lignin. The bands at 1,220 cm$^{-1}$ corresponding to C—C, C—O, and C=C stretching in G-lignin were unchanged for treated lignin when compared to untreated alkaline lignin. Preferential breakdown of S-lignin has been observed before via oxidation of alkaline lignin using transition metal catalysts (Liu, Das et al. 2017)' (Das, Kolar et al. 2012).

Gel Permeation Chromatography

Figure 12A:
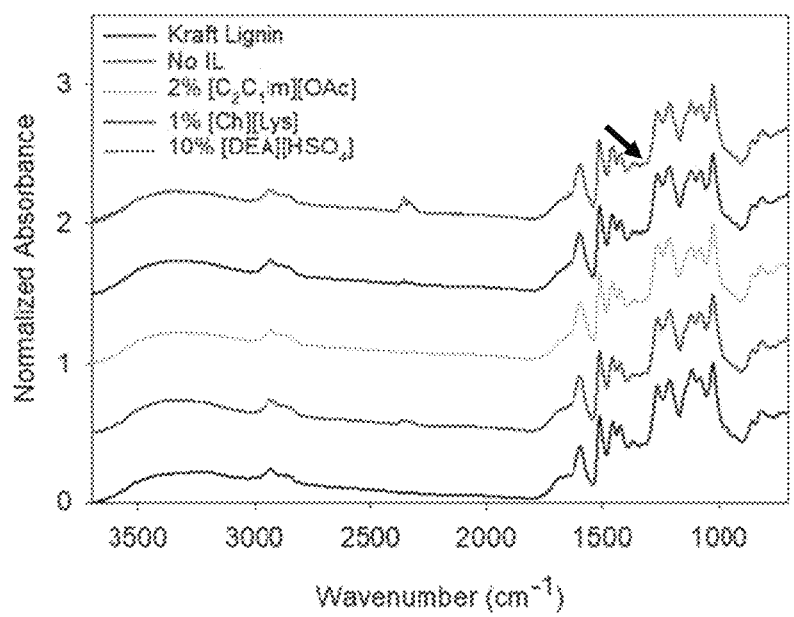
FIG. 12a shows FTIR spectra of Kraft lignin before and after treatment with laccase, AILs, and ABTS (The arrow indicates the corresponding S-lignin peak)
Figure 12B:
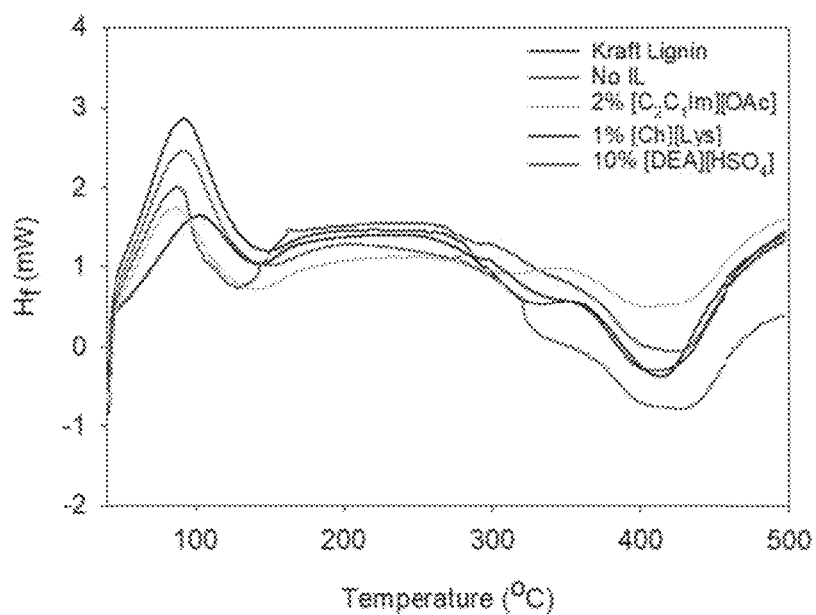
FIG. 12b shows thermal profiles of Kraft lignin before and after treatment with laccase, AILs, and ABTS.

Gel permeation chromatography (GPC) results revealed all treatments resulted in a small increase in average molecular weight when compared to untreated Kraft lignin, as can be seen in FIG. 10a. Additionally, the polydispersity index (PDI) decreased for all treatments when compared to untreated kraft lignin. Treatment of Kraft lignin with laccase and HBT, another mediator, resulted in a reduced PDI and increased molecular weight (Li, Xie et al. 2017). GPC of supernatant revealed the presence of higher molecular weight solids in treatments with ILs compared to treatment without IL. These results indicate the AIL increases solubility of some fraction of Kraft lignin in the system. The results of FTIR indicate this fraction is S-lignin, which is confirmed with NMR analysis. See FIGS. 12a and 12b.

2D HSQC NMR

Figure 13:
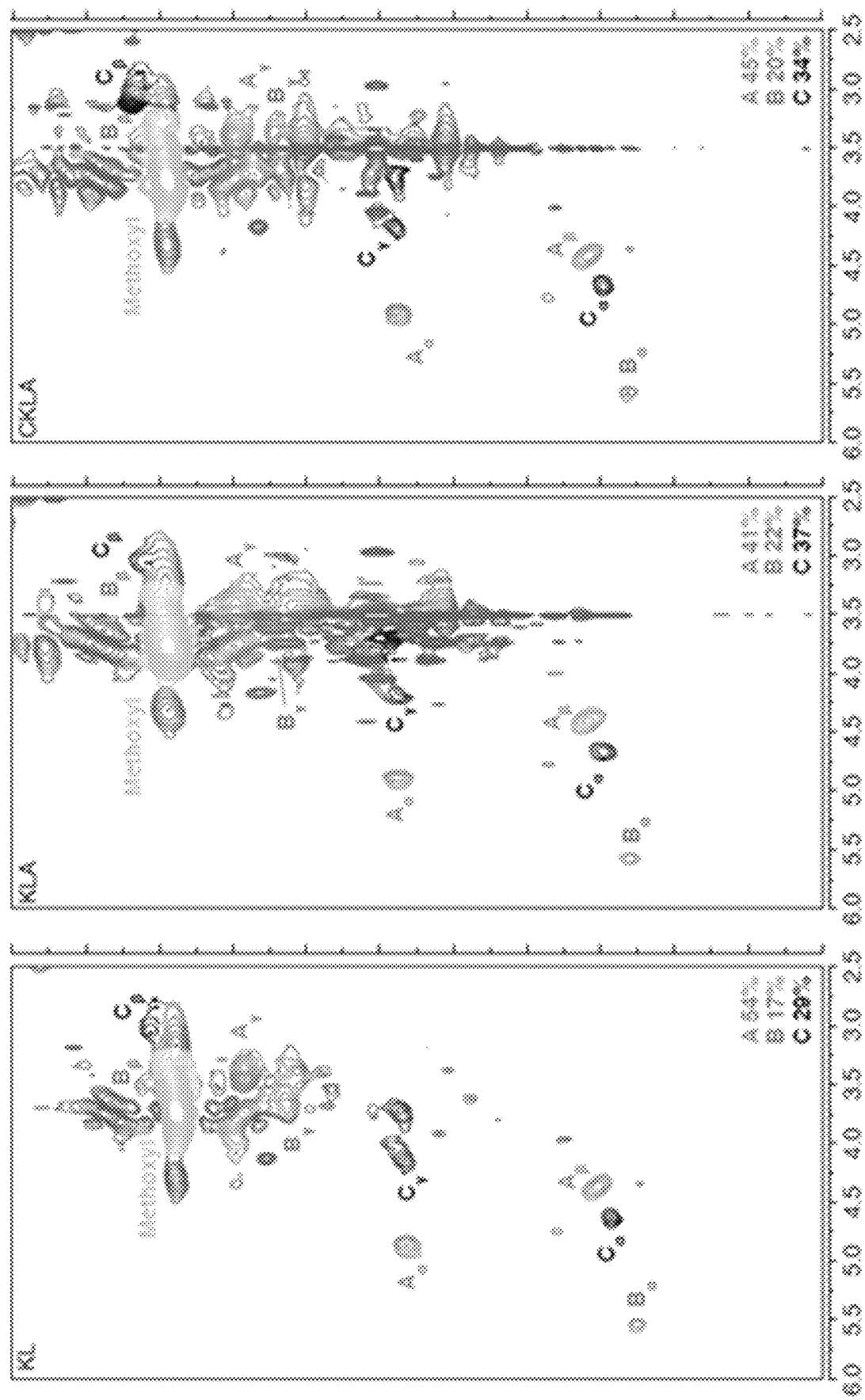
FIG. 13 shows 2D HSQC NMR spectra of Kraft lignin before and after treatment with laccase, AILs, and ABTS. The aliphatic spectra and the aromatic spectra are shown.
Figure 13:
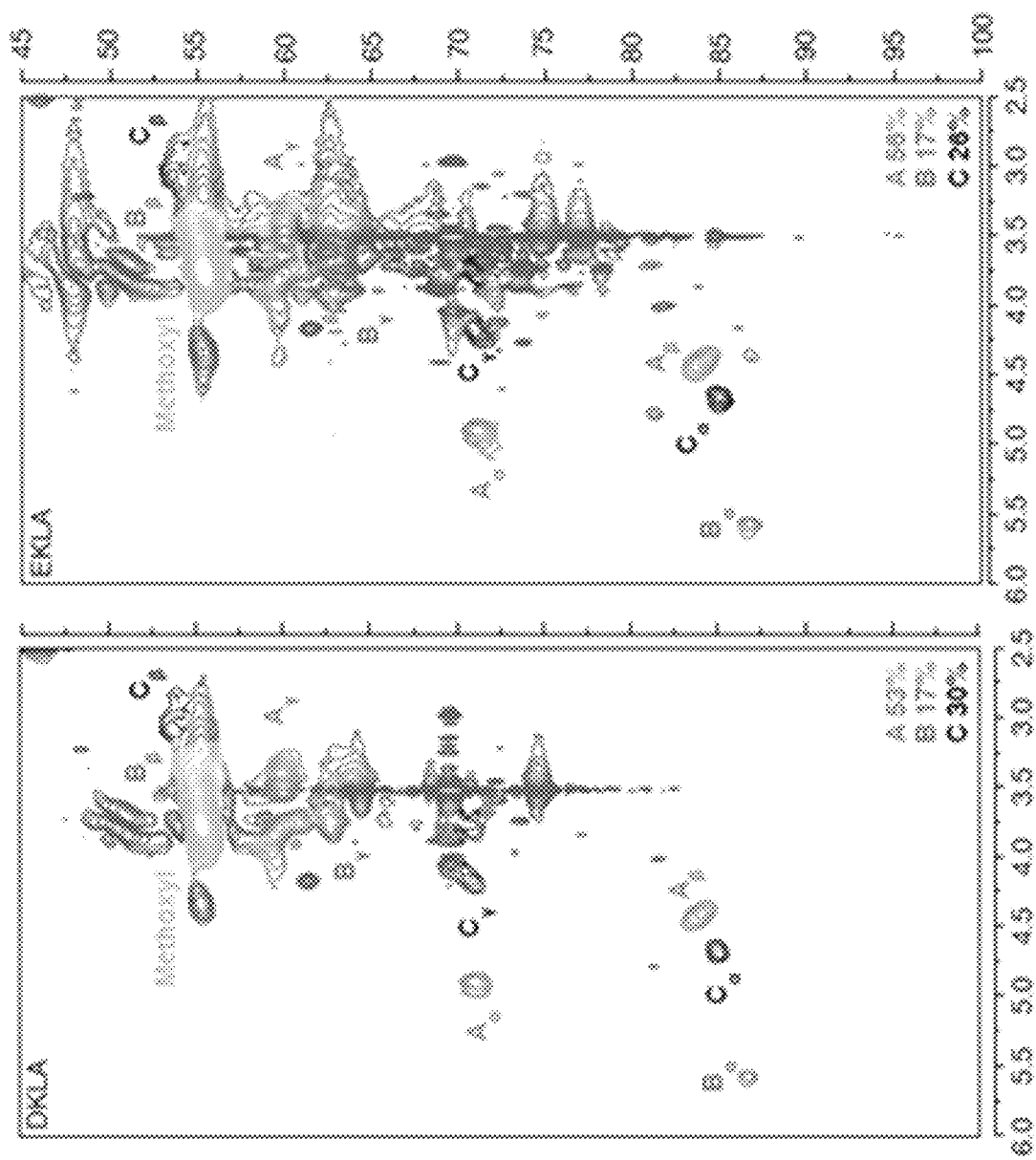
Figure 13:
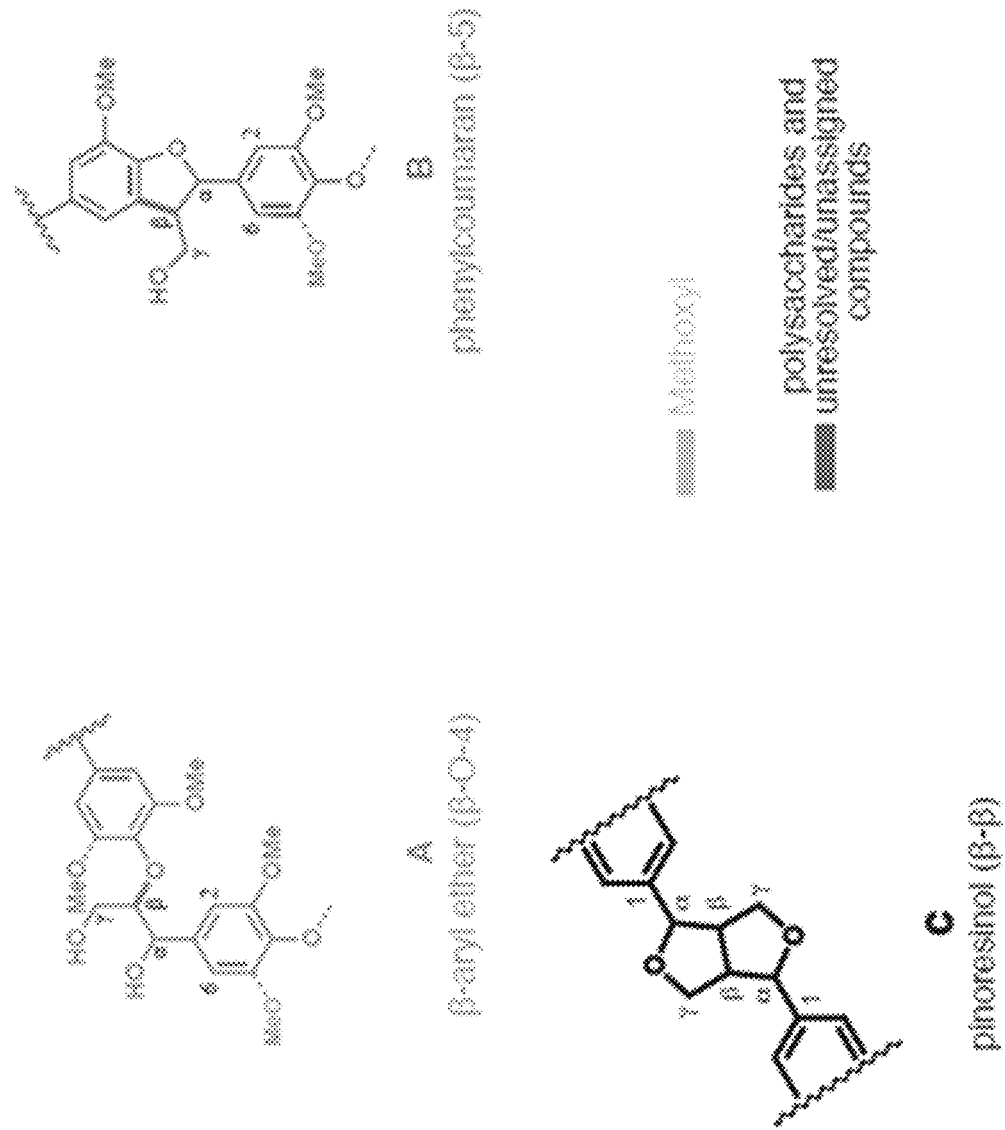
Figure 13:
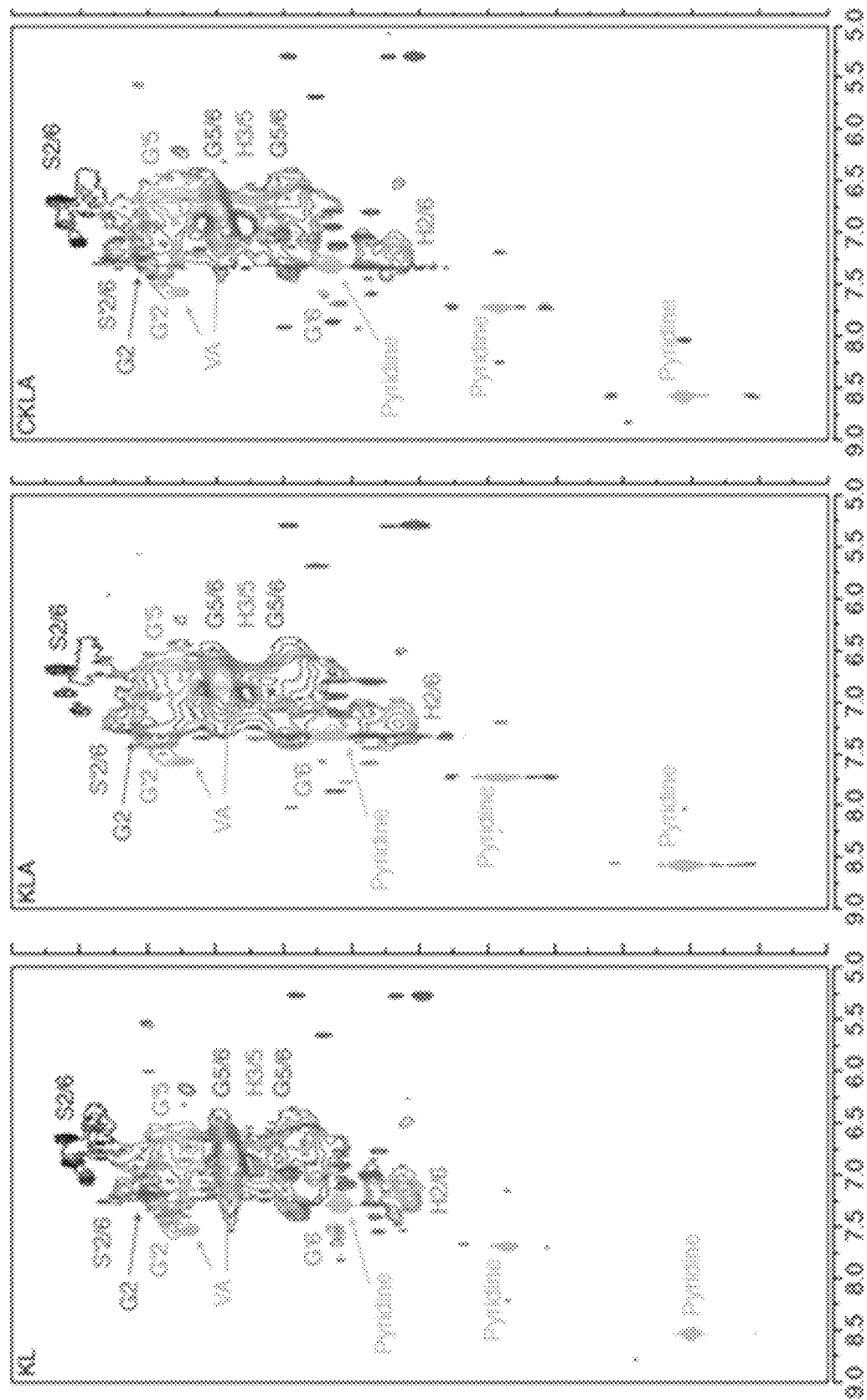
Figure 13:
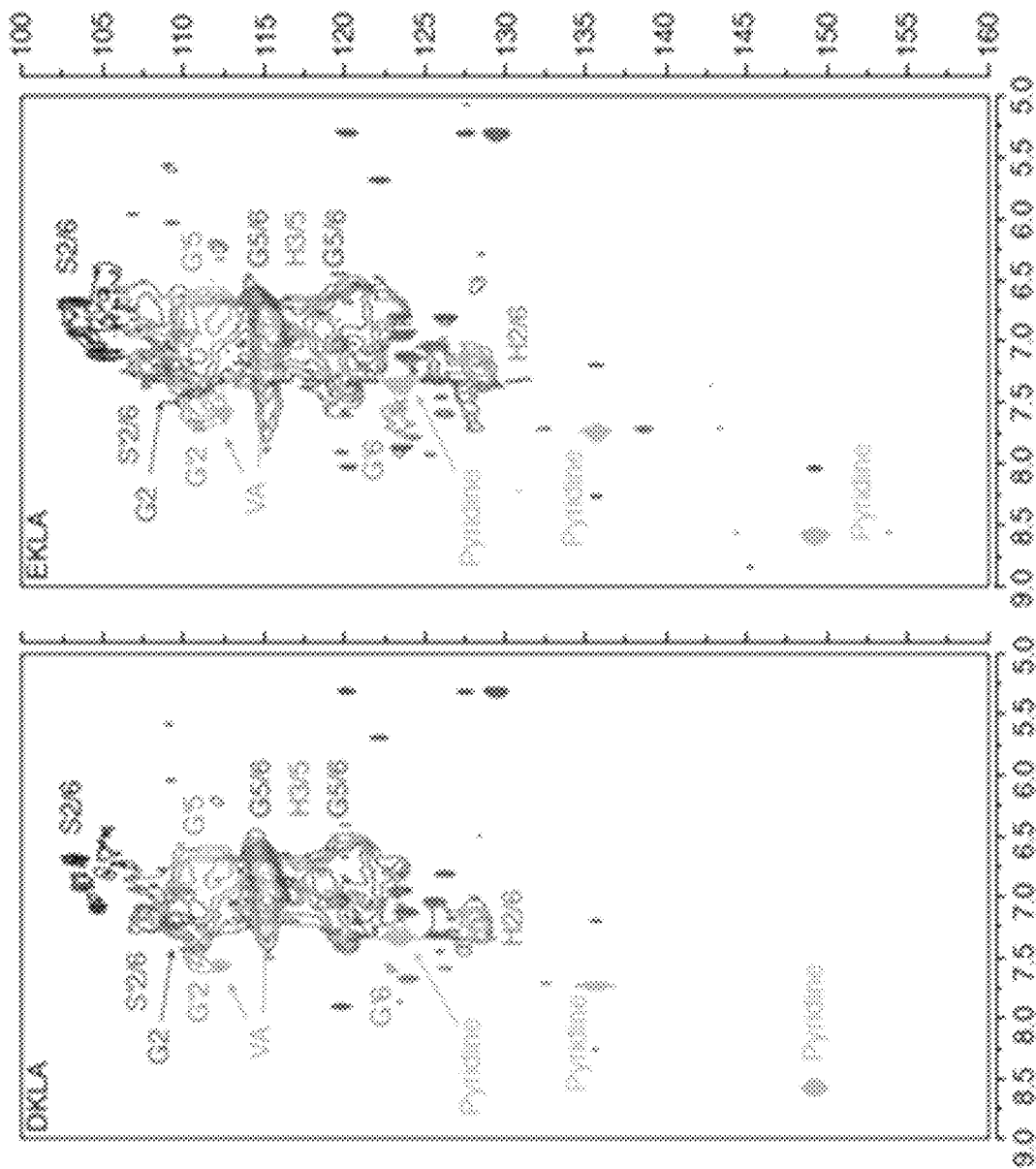
Figure 13:
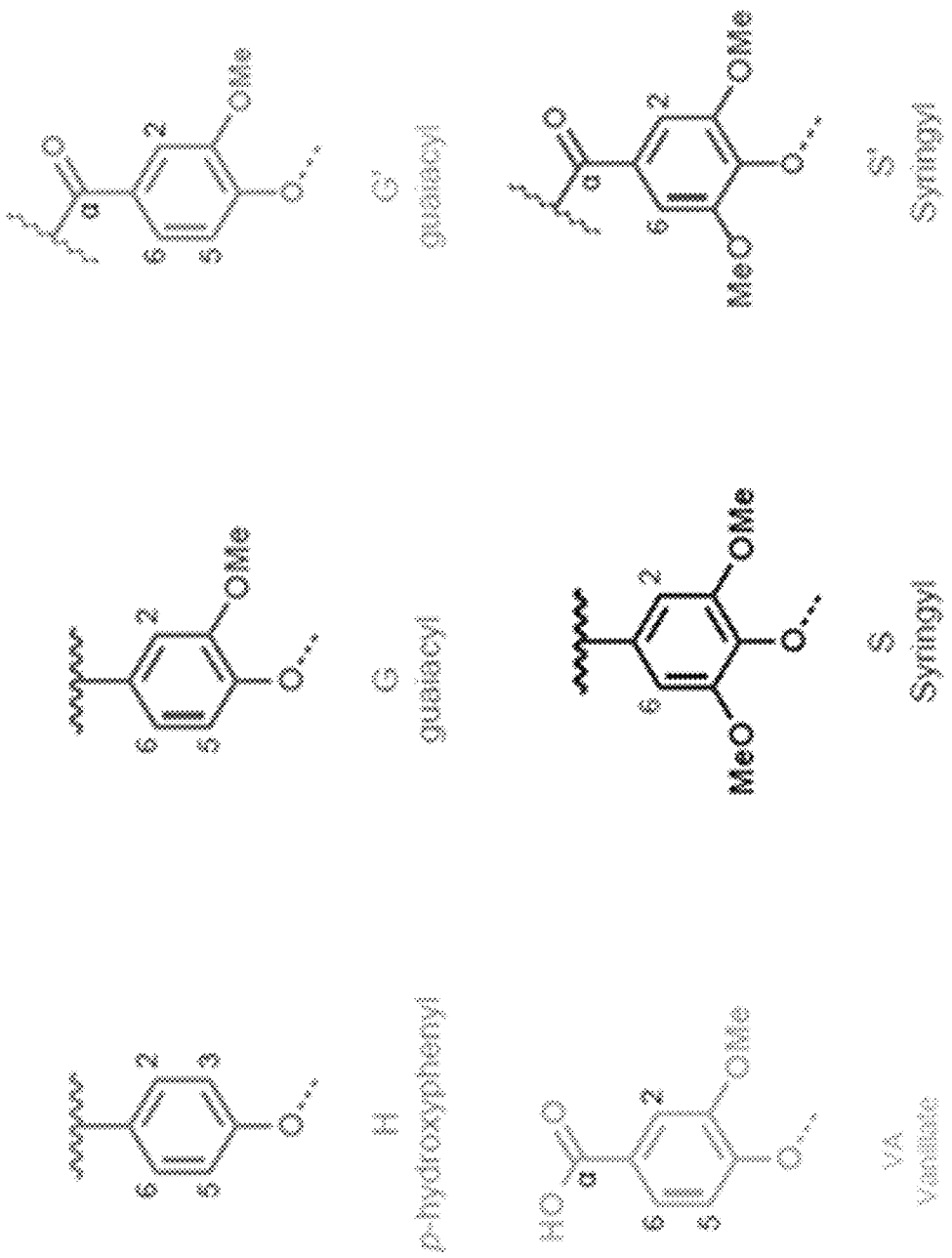

The spectra obtained from 2D HSQC NMR confirmed that there is a reduction in S-lignin peaks (FIG. 13). Additionally, there were substantial shifts in the ratios of β-O-4' and β-β' linkages in Kraft lignin after treatment. The most substantial changes were the ratios of β-O-4' and β-β' linkages in the KLA and EKLA samples. β-O-4' linkages in Kraft lignin treated without any AILs present were reduced from 49% to 41%. Kraft lignin treated with [C$_2$C$_1$Im][OAc] resulted in increased β-O-4' (49%→56%) and reduced β-β (34%→26%) linkages. Treatment of Kraft lignin with laccase and HBT resulted in a shift in linkage ratios (Li, Xie et al. 2017). It is possible that the presence of the AILs could have altered the effects on the linkage ratios. To fully understand these effects, a more in-depth analysis of lignin after treatment would need to be completed.

Differential Scanning Calorimetry

Thermal profiles are similar for all samples of untreated and treated alkaline lignin. Exothermic and endothermic regions are indicated by positive and negative values of H$_f$, respectively. An exothermic region between 50-100° C. was observed for all samples. Similarly, an endothermic region between 400-450° C. was observed for all samples. The low temperature and concentration of ILs prevented any significant changes to the lignin structure.

CONCLUSION

The results of this study provide important insight into the interactions between laccase and AILs. The effects of 3 AILs on laccase activity, inhibition, and oxidative capability were consistent throughout multiple experiments. Experiments with ABTS indicated [DEA][HSO$_4$] did not impede the ability of laccase to oxidize ABTS, whereas [C$_2$C$_1$Im][OAc] and [Ch][Lys] were more inhibitory. Further enzyme kinetics work, using Lineweaver-Burke curves and docking simulations, shed light on the binding mechanisms between laccase and AILs. [DEA][HSO4] favors binding to the [E][S] complex, whereas [C2C1Im][OAc] and [Ch][Lys] interfere with the residues surrounding the entrance to the active site.

We further investigated the effects of AILs on the laccase oxidative mechanism with a β-O-4' linked lignin model compound as a substrate. Results indicate that the effects of the AILs on laccase extend to the oxidation of lignin. Laccase in [C2C1Im][OAc] and [Ch][Lys] require the presence of the mediator ABTS to cleave the β-O-4' linkage. Alternatively, laccase in [DEA][HSO4] does not require ABTS to cleave the same linkage. This selective cleavage of the β-O-4' linkage highlighted the potential of directing product formation from lignin degradation with AILs and laccase. This was not the case, however, since products obtained from the degradation of Kraft lignin were the same, regardless of which AIL was present in the system. Conversion of lignin to products was very low due to the mild reaction conditions that favored optimal laccase activity. Additionally, a severely degraded Kraft lignin was used, so it was unlikely our system would further degrade this substrate.

In the future, thermophilic laccases might serve as a more suitable biocatalyst for lignin valorization due to their ability to resist AIL inhibition and favor higher temperatures. Biomass-derived lignin might also serve as a more ideal substrate than Kraft lignin to better assess the effectiveness (conversion, yield, etc.) of this lignin valorization system. Collectively, this work provides an in-depth look into the interactions between a fungal laccase and AILs to better understand the mechanisms that inhibit laccase activity. This work also provides a proof-of-concept system for lignin valorization using laccase and AILs.

1. Doherty et al., *Industrial Crops and Products*, 2011, 33, 259-276.
2. Chatel et al., *ACS Sustainable Chemistry & Engineering*, 2014, 2, 322-339.
3. Mamman et al., *Biofuels, Bioproducts and Biorefining*, 2008, 2, 438-454.
4. Weng et al., *New Phytologist*, 2010, 187, 273-285.
5. Vanholme et al., *Plant Physiology*, 2010, 153, 895-905.
6. Sette et al., *Journal of Agricultural and Food Chemistry*, 2013, 61, 10848-10857.
7. 
8. Suhas et al., *Bioresource Technology*, 2007, 98, 2301-2312.
9. Tilman et al., *Science*, 2009, 325, 270-271.
10. N. A. o. Sciences, N. A. o. Engineering and N. R. Council, *Liquid Transportation Fuels from Coal and Biomass: Technological Status, Costs, and Environmental Impacts*, The National Academies Press, Washington, D C, 2009.
11. Pettersson, Doctorate, Chalmers University of Technology, 2011.
12. Mottiar et al., *Current Opinion in Biotechnology*, 2016, 37, 190-200.
13. Ragauskas et al., *Science*, 2014, 344.
14. Kleinert et al., *Energy & Fuels*, 2008, 22, 1371-1379.
15. Cotoruelo et al., *Adsorption*, 2011, 17, 539-550.
16. Penkina et al., *International Journal of Biological Macromolecules*, 2012, 51, 939-945.
17. Bankar et al., *Biotechnology Advances*, 2009, 27, 13.
18. Berson et al., in *Twenty-Seventh Symposium on Biotechnology for Fuels and Chemicals*, eds. J. D. McMillan, W. S. Adney, J. R. Mielenz and K. T. Klasson, Humana Press, Totowa, N.J., 2006, DOI: 10.1007/978-1-59745-268-7_49, pp. 612-620.
19. Liu et al., *BioEnergy Research*, 2017, DOI: 10.1007/s12155-017-9868-x.
20. George et al., *Green Chemistry*, 2015, 17, 1728-1734.
21. Brandt et al., *Green Chemistry*, 2013, 15, 550-583.
22. Das, P. Kolar and R. Sharma-Shivappa, *Biofuels*, 2012, 3, 155-166.
23. Rogers et al., *Science*, 2003, 302, 792-793.
24. Patel et al., *Applied Biochemistry and Biotechnology*, 2014, 172, 3701-3720.
25. Brennecke et al., *AIChE Journal*, 2001, 47, 2384-2389.
26. Gutowski et al., *Journal of the American Chemical Society*, 2003, 125, 6632-6633.
27. Verdia et al., *Green Chemistry*, 2014, 16, 1617-1627.
28. Fort et al., *Green Chemistry*, 2007, 9, 63-69.
29. Kilpeläinen et al., *Journal of Agricultural and Food Chemistry*, 2007, 55, 9142-9148.
30. Yoshida, *Journal of the Chemical Society, Transactions*, 1883, 43, 472-486.
31. An et al., *Electronic Journal of Biotechnology*, 2015, 18, 451-458.
32. Kiiskinen et al., *Microbiology*, 2004, 150, 3065-3074.
33. Hullo et al., *Journal of Bacteriology*, 2001, 183, 5426-5430.
34. Piontek et al., *Journal of Biological Chemistry*, 2002, 277, 37663-37669.
35. Semba et al., *Protein Engineering, Design and Selection*, 2015, 28, 221-230.
36. Dong et al., *Environmental Science and Pollution Research*, 2014, 21, 2358-2366.
37. Glenn et al., *Biochemical and Biophysical Research Communications*, 1983, 114, 1077-1083.
38. Gamelas et al., *Journal of Molecular Catalysis B: Enzymatic*, 2005, 33, 57-64.
39. Rico et al., *Biotechnology for Biofuels*, 2014, 7, 6.

40. Moniruzzaman et al., *Organic & Biomolecular Chemistry*, 2010, 8, 2887-2899.
41. Du et al., *J Ind Microbiol Biotechnol*, 2011, 38.
42. Attri et al., *Physical Chemistry Chemical Physics*, 2011, 13, 2788-2796.
43. Naushad et al., *International Journal of Biological Macromolecules*, 2012, 51, 555-560.
44. Alberto Domínguez et al., *Bioresource Technology*, 2011, 102, 6.
45. Fernández-Fernández et al., *Biotechnology Progress*, 2014, 30, 7.
46. Galai et al., *RSC Advances*, 2015, 5, 17.
47. George et al., *Green Chemistry*, 2015, 17, 1728-1734.
48. Trott et al., *Journal of Computational Chemistry*, 2010, 31, 455-461.
49. Deng et al., *Green Chemistry*, 2015, 17, 5009-5018.
50. Prado et al., *Green Chemistry*, 2016, 18, 834-841.
51. Guerra et al., *Journal*, 2008, 62, 24.
52. Rehmann et al., *Green Chemistry*, 2012, 14, 725-733.
53. Sun et al., *Molecules*, 2017, 22, 1353.
54. Jia et al., *ChemSusChem*, 2010, 3, 1078-1084.
55. Li et al., *Green Chemistry*, 2017, 19, 1628-1634.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled. Further, all references cited herein are incorporated by reference in their entirety.

The invention claimed is:

1. A method for extracting compounds from lignin comprising contacting a lignin source with an ionic liquid (IL) and a deep eutectic solvent (DES); adding a catalyst thereto; allowing time for decomposition; and, extracting valorized compounds from the IL and DES mixture.

2. The method of claim 1, wherein the catalyst comprises a transition metal or oxide thereof.

3. The method of claim 1, wherein the catalyst comprises Cu, Mn, Mg, Co, Zn, Fe, Ti, Cr, and Ni or oxides thereof.

4. The method of claim 1, wherein the catalyst is characterized by the general formula of $ABO_3$ where A is a rare earth, alkaline earth, alkali, or large ion cations; and B is cations of transition metals.

5. The method of claim 1, wherein the catalyst is a polyoxometalate (POMs) of Group V and VI metals.

6. The method of claim 5, wherein the metal is W, Mo, V, and Nb.

7. The method of claim 1, wherein the catalyst is a biocatalyst.

8. The method of claim 7, wherein the biocatalyst is selected from the group consisting of laccases, peroxidases, LMPOs, xylanases, and LigA-G.

9. The method of claim 8, wherein the biocatalyst is a laccase.

10. The method of claim 9, wherein the laccase is of a fungal, bacterial, archaeal, recombinant source, or combinations thereof.

11. The method of claim 7, wherein the biocatalyst comprises a lignolytic microbe.

12. The method of claim 11, wherein the lignolytic microbe is a yeast, *E. coli*, rodoccocus, or engineered microbes that are designed to depolymerize lignin, or combination thereof.

13. The method of claim 1, wherein the lignin source is Kraft, organosolv, alkaline, acid, lignosulfate, or combinations thereof.

14. The method of claim 1, wherein the process occurs in a free solution.

15. The method of claim 1, wherein the process occurs on a supported surface.

16. The method of claim 15, wherein the supported surface is a membrane, biofilm, zeolite, or MOF.

17. The method of claim 1, wherein the process occurs in a single reaction chamber.

18. The method of claim 1, wherein the process occurs in a reactor with a membrane to isolate the by-products.

19. The method of claim 1, wherein the process occurs under a pH in the range of 1-12, a temperature in the range of 2-200° C. and a pressure in the range of 0-200 psi.

* * * * *